United States Patent
Meyer et al.

(10) Patent No.: US 12,260,214 B1
(45) Date of Patent: Mar. 25, 2025

(54) THROUGHPUT INCREASE FOR COMPUTE ENGINE

(71) Applicant: Amazon Technologies, Inc., Seattle, WA (US)

(72) Inventors: Paul Gilbert Meyer, Jericho, VT (US); Ron Diamant, San Jose, CA (US); Sundeep Amirineni, Cedar Park, TX (US); Sunil Kumar Bathula, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 17/937,332

(22) Filed: Sep. 30, 2022

(51) Int. Cl.
*G06F 9/38* (2018.01)
*G06F 9/30* (2018.01)
*G06F 13/16* (2006.01)

(52) U.S. Cl.
CPC ...... *G06F 9/30036* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 5,867,414 A * | 2/1999 | Kao | ...................... | G06F 17/147 |
| | | | | 708/607 |
| 5,987,561 A * | 11/1999 | Witt | ...................... | G06F 9/3832 |
| | | | | 711/204 |
| 7,250,896 B1 * | 7/2007 | Hesener | ................. | H03M 1/462 |
| | | | | 341/163 |
| 11,269,632 B1 | 3/2022 | Albarakat et al. | | |
| 2003/0014457 A1 * | 1/2003 | Desai | .................. | G06F 9/30032 |
| | | | | 712/E9.071 |
| 2006/0179382 A1 * | 8/2006 | Bunce | ................. | G06F 12/0207 |
| | | | | 714/737 |
| 2021/0042260 A1 | 2/2021 | Reinhardt et al. | | |
| 2021/0117977 A1 | 4/2021 | Kim et al. | | |
| 2021/0149680 A1 * | 5/2021 | Hughes | .................... | G06F 9/544 |
| 2021/0150663 A1 * | 5/2021 | Maiyuran | ........... | G06F 12/0802 |

(Continued)

OTHER PUBLICATIONS

U.S. Appl. No. 18/185,236, inventors Tan et al., filed Mar. 16, 2023.

(Continued)

*Primary Examiner* — Hyun Nam
(74) *Attorney, Agent, or Firm* — Weaver Austin Villeneuve & Sampson LLP

(57) ABSTRACT

A compute channel can have multiple computational circuit blocks coupled in series to form a pipeline. The compute channel can perform a computation on an input tensor to generate an output tensor based on an instruction. When the computational does not require all of the computational circuit blocks, the throughput of the compute channel can be increased by splitting the data elements of the input tensor into multiple input data streams. The multiple input data streams are provided to respective subsets of one or more computational circuit blocks in the pipeline using bypass circuitry of the computational circuit blocks, and the computation can be performed on multiple input data streams in the respective subsets of one or more computational circuit blocks to generate multiple output data streams corresponding to the output tensor.

21 Claims, 13 Drawing Sheets

(56) References Cited

U.S. PATENT DOCUMENTS

| | | |
|---|---|---|
| 2021/0349718 A1* | 11/2021 | Wang .................. G06F 9/544 |
| 2021/0398621 A1* | 12/2021 | Stojevic ................ G16C 20/30 |
| 2021/0406018 A1 | 12/2021 | Adelman et al. |
| 2022/0100500 A1* | 3/2022 | Madaelil ................ G06F 9/382 |
| 2022/0405123 A1 | 12/2022 | Bradbury et al. |
| 2022/0413851 A1* | 12/2022 | Gurram .................. G06F 17/16 |
| 2022/0414054 A1* | 12/2022 | Parra .................... G06F 9/3001 |
| 2022/0414182 A1 | 12/2022 | Adelman et al. |
| 2024/0378250 A1* | 11/2024 | Garrett ........... G06Q 10/063112 |

OTHER PUBLICATIONS

U.S. Notice of Allowance dated May 21, 2024 in U.S. Appl. No. 18/185,236.

* cited by examiner

THROUGHPUT INCREASE FOR COMPUTE ENGINE

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understanding human language, or in computer vision systems to analyze and react to images and video frames. The weights used in a specific neural network can be determined via a training process in which the weight values are tuned to yield better predictions.

BRIEF DESCRIPTION OF THE DRAWINGS

Various embodiments in accordance with the present disclosure will be described with reference to the drawings, in which.

DETAILED DESCRIPTION

Figure 1:
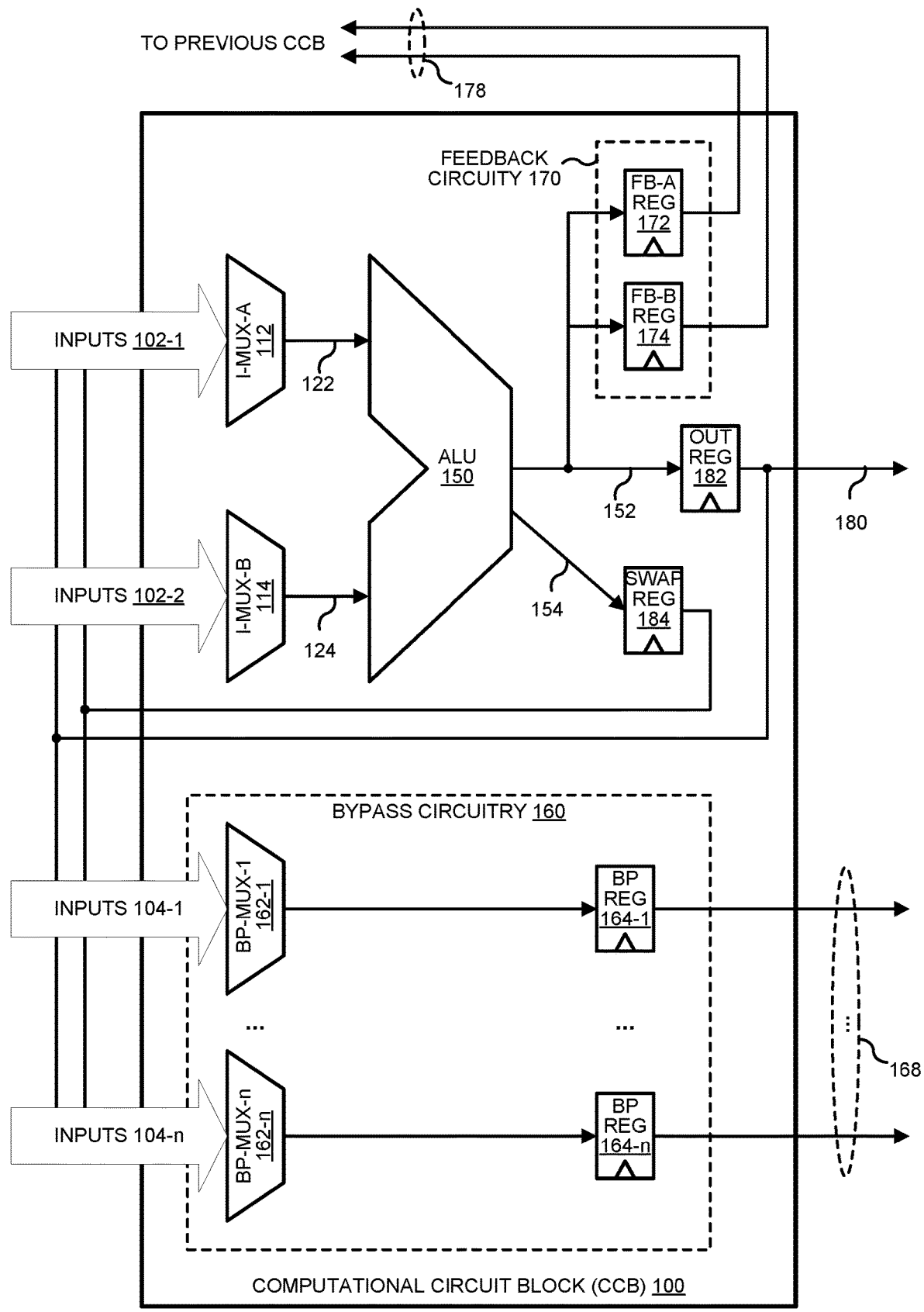
FIG. 1 illustrates a block diagram of an example of a computational circuit block.

Matrix multiplication is a common type of computation used in neural networks. As such, much effort has been made to improve execution of matrix multiplication operations in hardware. For example, a systolic array is a hardware architecture that can provide much better matrix multiplication throughput than a general-purpose processor. Although a systolic array can significantly improve matrix multiplication throughput, a neural network may utilize other types of computations that may not be suitable for execution in a systolic array. For example, batch normalization is a common neural network training technique to normalize input data using the mean and variance of data samples. As another example, pooling is a common neural network operation to down sample a data set by selecting a data element or combing data elements from a window size of data elements. Even if some of these other neural network computations can be executed in the systolic array, it may be advantageous to offload such computations to a separate compute engine to preserve the computational bandwidth of the systolic array for matrix multiplication operations.

One example of such a compute engine is a vector compute engine. The vector compute engine may include multiple compute channels that can be programmed to perform parallel computations such as calculating the mean and variance of tensors streamed into the compute engine. Each compute channel may include multiple computational circuit blocks or compute stages coupled in series to form a pipeline in which the output of one computational circuit block is fed as an input to the next computational circuit block. Although such a compute channel architecture can be very efficient when performing complex computations such as computing a variance of a set of serially inputted data elements, the compute channel can be underutilized when performing less complex computations that do not require the full chain of computational circuit blocks in the pipeline.

The techniques disclosed herein provide a compute channel with various throughput increase modes to improve the throughput of the compute channel when performing computations that do not require full utilization of the compute stages in the pipeline. Each computational circuit block in the compute channel may include bypass circuitry to feed forward data elements received at the input of the computational circuit block to the output of the computational circuit block without performing computations on the bypassed data elements. The bypass circuitry allows separate input data streams to be provided to separate groups of computational circuit blocks in the pipeline. As such, each group of computational circuit blocks in the pipeline can process a different input data stream to increase the throughput of the compute channel.

To enable multiple input data streams to be inputted into the compute channel, a memory read interface circuit coupled to the input of the compute channel can be implemented with multiple memory read ports, and each memory read port can be coupled to multiple virtual input ports. This allows the memory read interface circuit to concurrently read data from multiple memory locations using the multiple memory read ports to generate multiple input data streams, and/or to split the data being read on a memory read port into multiple input data streams provided on respective virtual input ports for the compute channel. Similarly, a memory write interface circuit coupled to the output of the compute channel can be implemented with multiple memory write ports, and each memory write port can be coupled to multiple virtual output ports that receive output data streams from the compute channel. This allows the memory write interface circuit to concurrently write data to multiple memory locations using the multiple memory write ports, and/or to concatenate data from different output data steams for writing to memory on a memory write port.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computational circuit block (CCB) 100 that can be implemented in a computational pipeline of an integrated circuit device. Computational circuit block 100 includes an arithmetic logic unit (ALU) circuit 150. ALU circuit 150 can be implemented to process floating-point numeric inputs of up to a certain bit length such as 32-bit floating point numbers (FP32). ALU circuit 150 can also be configurable to support numeric inputs of other datatypes such as 8-bit integers (INT8), 16-bit integers (INT16), 16-bit brain floating point numbers (BF16), 16-bit floating point numbers (FP16), or datatypes have a bit length that is less than or equal to the maximum supported datatype bit length. ALU circuit 150 includes a first numeric input 122 selected by an input multiplexor 112, a second numeric input 124 selected by an input multiplexor 114, and a primary result output 152. ALU circuit 150 can be programmed to perform various computational operations on first numeric input 122 and/or second numeric input 124 to generate primary result output 156.

For example, ALU circuit 150 can be programmed to generate primary result output 152 by selecting a computational operation from various available operations to perform on the numeric input(s). The computational operations may include one or more of a passthrough function (or identity function) of the first numeric input 122, bitwise inversion of the first numeric input 122, arithmetic left shift of the first numeric input 122 by a number of bits indicated by the second numeric input 124, arithmetic right shift of the first numeric input 122 by a number of bits indicated by the second numeric input 124, addition of the first numeric input 122 and the second numeric input 124, subtraction of the second numeric input 124 from the first numeric input 122, multiplication of the first numeric input 122 and the second numeric input 124, division of the first numeric input 122 by the second numeric input 124, select the maximum (MAX) of the first numeric input 122 and the second numeric input 124, select the minimum (MIN) of the first numeric input 122 and the second numeric input 154, bitwise AND of the first numeric input 122 and the second numeric input 124, bitwise OR of the first numeric input 122 and the second numeric input 122, bitwise XOR of the first numeric input 122 and the second numeric input 124, logical AND of the first numeric input 122 and the second numeric input 124, logical OR of the first numeric input 122 and the second numeric input 122, logical XOR of the first numeric input 122 and the second numeric input 124, logical left shift of the first numeric input 122 by a number of bits indicated by the second numeric input 124, logical right shift of the first numeric input 122 by a number of bits indicated by the second numeric input 124, etc. In some implementations, the computational operations may also include comparison functions such as whether the first numeric input 122 is equal to, not equal to, greater than, great than or equal to, less than or equal to, and/or less than the second numeric input 124, etc. Other supported computational operations may include an absolute difference between the first numeric input 122 and the second numeric input 124, selection of the first numeric input 122 or the second numeric input 124, and/or other functions to generate a value based on the first numeric input 122 and/or the second numeric input 124. ALU circuit 150 can also be programmed to apply the computational operation with the first numeric input 122 reversed with the second numeric input 124. Although various computational operations have been described, depending on the application and usage of ALU circuit 150, the computational logic within ALU circuit can be simplified to support fewer of the computational operations described above. In some implementations, ALU circuit 150 can also support other computational operations not specifically described.

ALU circuit 150 may include a secondary output 154 to loopback the first numeric input 122 or the second numeric input 124 to computational circuit block 100. This secondary output 154 can provide a swap out path for the ALU circuit 150 to retain a value that was inputted into the ALU circuit 150 (e.g., by storing the value in a swap register 184). This capability of ALU circuit 150 allows a computation pipeline composed of such ALU stages to provide native hardware support for ordering manipulations such as sorting a series of data elements, or finding and locating data elements of a vector being streamed into the pipeline. For example, when ALU circuit 150 is programmed to perform a maximum function, the larger of the first numeric input 122 and the second numeric input 124 can be outputted to the next ALU stage, and the other unselected numeric input can be outputted on the secondary output 154. Similarly, when ALU circuit 150 is programmed to perform a minimum function, the smaller of the first numeric input 122 and the second numeric input 124 can be outputted to the next ALU stage, and the other unselected numeric input can be outputted on the secondary output 154.

Computational circuit block 100 includes an output register 182 configured to receive the primary result output 152 of ALU circuit 150, and provide the primary result output 152 of ALU circuit 150 as the primary output 180 of computational circuit block 100 to the next CCB. By registering primary result output 152, pipeline stages of computational circuit blocks can be coupled in series to create a computational pipeline in which input values are operated on at each clock cycle by an ALU stage, and the result is provided to the next ALU stage for further processing in the next clock cycle. Computational circuit block 100 also includes a swap register 184 configured to receive the secondary output 154 of ALU circuit 150, and to feedback the secondary output 154 as one of the inputs to the computational circuit block 100 at the next clock cycle. As mentioned above, the swap register 184 can be used to store and retain a value being streamed into computational circuit block 100 to allow efficient sort, search, and/or locate functions to be performed.

Computational circuit block 100 may also include feedback circuitry 170 having one or more feedback registers that are each configured to receive the primary result output 152 of the ALU circuit 150, and provide the primary result output 152 of the ALU circuit 150 to a previous computational circuit block of the pipeline. In some implementations, the feedback circuitry 170 can include multiple feedback registers to enable computational circuit block 100 to maintain and store multiple running computational results on different sets of data elements being streamed into the pipeline. For instance, feedback circuitry 170 may include two feedback registers 172 and 174 that are each individually configured to receive the primary result output 152 of the ALU circuit 150 to feedback to the previous computational circuit block. Each of feedback registers 172 and 174 can have its own independent enable signals. During operation, computational circuit block 100 can be programmed to sequentially enable to the first feedback register 172 alternately with the second feedback register 174 at each clock cycle. Hence, the first feedback register 172 will be updated with the computational result of ALU circuit 150 every other clock cycle, and the second feedback register 172 will be updated with the computational result of ALU circuit 150 alternately in the clock cycles in between. This allows computational circuit block 100 to maintain a first computational result in feedback register 172 that are computed from odd sequenced data elements (e.g., first, third, fifth, etc. data elements being streamed into the pipeline), and a second computational result in feedback register 174 that are computed from even sequenced data elements (e.g., second, fourth, sixth, etc. data elements being streamed into the pipeline). For example, feedback register 172 can be used to maintain a running sum of the odd sequenced data elements of an input vector, and feedback register 174 can be used to maintain a running sum of the even sequenced data elements of the input vector. By controlling the independent enables of the feedback registers, running computational results of various data patterns can be achieved.

Computational circuit block 100 may also include bypass circuitry 160 having one or more bypass circuits each including a bypass multiplexor coupled to a bypass delay register. Each bypass circuit is operable to independently select one of the inputs of computational circuit block 100 to output to the next computational circuit block of the pipeline on bypass outputs 168. For example, bypass circuitry 160 may include bypass multiplexor 162-1 to select an input for bypass delay register 164-1, and bypass multiplexor 162-n to select an input for bypass delay register 164-n. In some implementations, computational circuit block 100 may include, for example, at least three bypass circuits, six bypass circuits, or other number of bypass circuits. When coupled in a pipeline, bypass circuitry 160 enables an input data element or an intermediate computational result to be provided to different ALU stages in the pipeline. Bypass circuitry 160 also provides the capability for the different ALU stages to receive independent inputs, and allows the different ALU stages in the pipeline to operate independently on different sets of inputs.

Computational circuit block 100 may include an input multiplexor for each of the numeric inputs of the ALU circuit 150, as well as a bypass multiplexor for each of the one or more bypass circuits. In the implementation shown in FIG. 1, computational circuit block 100 has input multiplexors 112 and 114, and bypass multiplexors 162-1 to 162-n. Each of these multiplexors may independently select an input from a set of inputs of the computational circuit block 100. For example, input multiplexor 112 may select an input from the set of inputs 102-1 to provide as the first numeric input 122 for ALU circuit 150; input multiplexor 114 may select an input from the set of inputs 102-2 to provide as the second numeric input 124 for ALU circuit 150; bypass multiplexor 162-1 may select an input from the set of inputs 104-1 to provide to bypass delay register 164-1; and bypass multiplexor 162-n may select an input from the set of inputs 104-n to provide to bypass delay register 164-n.

Each set of inputs 102-1, 102-2, 104-1, and 104-n may include one or more of the following inputs: a primary output of the previous computational circuit block of the pipeline (or an input to the pipeline if it is the first computational circuit block), any of the outputs of the bypass circuits of the previous computational circuit block (or one of the inputs to the pipeline if it is the first computational circuit block), the primary output 180 of the computational circuit block 100 itself, the output of the swap register 184, and/or any of the outputs of the feedback registers from the next computational circuit block. In some implementations, the set of inputs 104-1 to 104-n selectable by each of the bypass multiplexors can be the same set of inputs, and the set of inputs 102-1 and 102-2 selectable by each of the input multiplexors can be the same set of inputs. Furthermore, the set of inputs 104-1 to 104-n can be the same as the set of inputs 102-1 and 102-2. Having each of the multiplexors able to select from the full set of inputs available to the computational circuit block 100 provides flexibility to program the computational circuit block 100 to perform various types of computations. Nevertheless, in some implementations, any one or more of the sets of inputs 102-1, 102-2, and 104-1 to 104-n may contain one or more inputs that are not available in another set of inputs, or may lack one or more inputs that are included in another set of inputs.

It should be noted that although computational circuit block 100 has been shown in FIG. 1 to include various features such as bypass circuitry 160, feedback circuitry 170, and swap register 182, other implementations of the computational circuit block may omit one or more components shown in FIG. 1. For example, a computational circuit block may include just one feedback register, or just one bypass circuit, or may include bypass circuitry without feedback circuitry, etc. Furthermore, computational circuit block 100 may include additional components not specifically shown.

Figure 2:
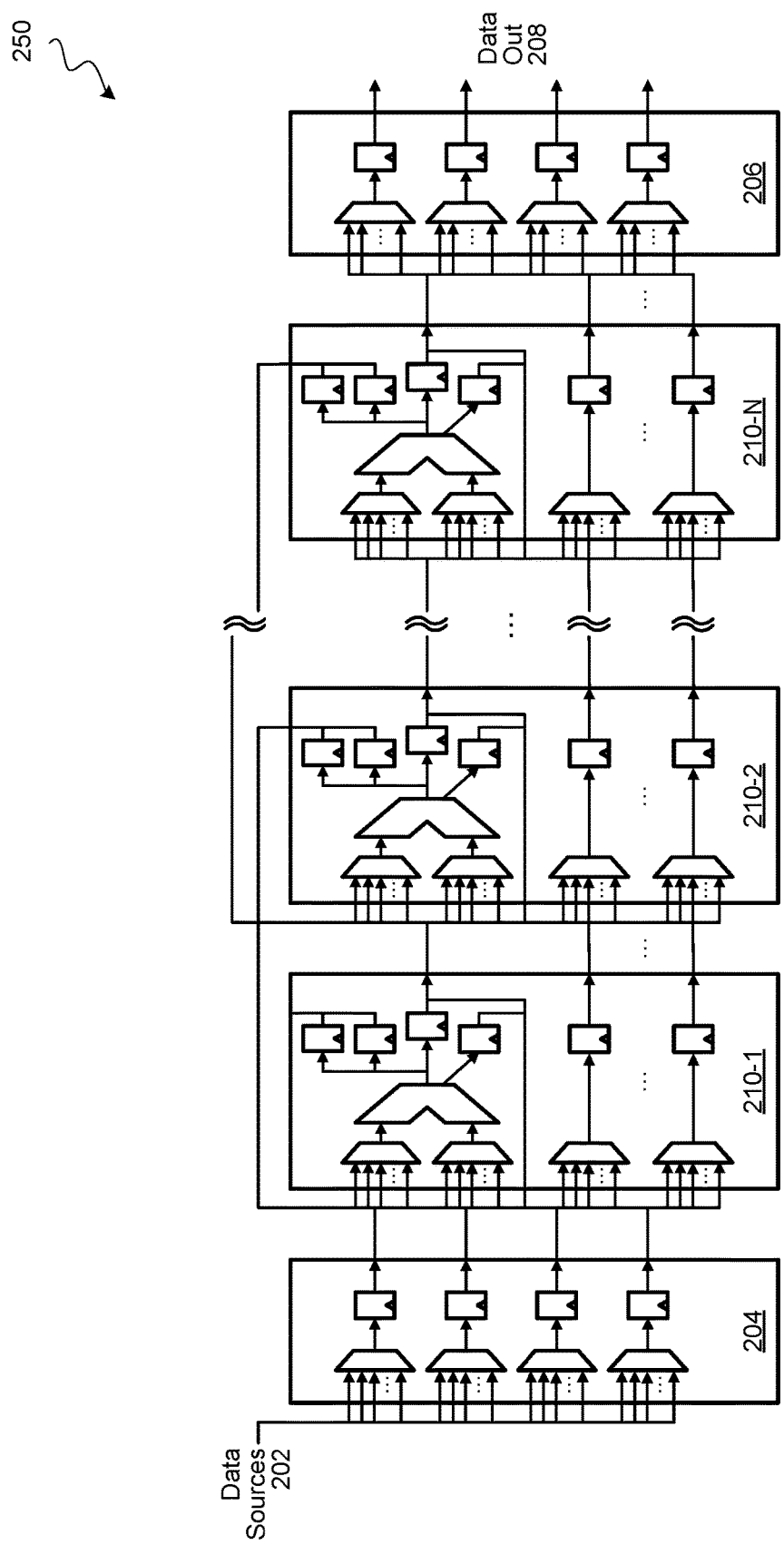
FIG. 2 illustrates a block diagram of an example of a compute channel.

FIG. 2 illustrates an example of an integrated circuit 250 implementing a compute channel formed by coupling multiple computational circuit blocks in series in a pipeline. Integrated circuit 250 can be, for example, part of a compute engine of a data processor (e.g., a data processing integrated circuit device such as a processor, a graphics processor, a digital signal processor, a tensor processor, a neural network accelerator, or other types of application specific integrated circuits). Integrated circuit 250 includes multiple computational circuit blocks 210-1 to 210-N coupled in series. The number of computational circuit blocks N can be at least four, at least eight, at least ten, at least sixteen, or other suitable number. Each computational circuit block in integrated circuit 250 can be implemented, for example, using computational circuit block 100. It should be noted that not each of the computational circuit blocks 210-1 to 210-N needs to be identical. For example, the first computational circuit blocks 210-1 does not have a previous computational circuit block to receive feedback outputs from the feedback circuitry. As such, the feedback circuitry can be omitted from the first computational circuit block 210-1. More generally, the components provided in each computational circuit block in the pipeline can be the same, or can vary depending on the application.

Each of computational circuit blocks 210-1 to 210-N includes an ALU circuit, and thus the pipeline in integrated circuit 250 can be considered as an ALU pipeline having multiple ALU stages coupled in series. Each ALU stage has a first numeric input, a second numeric input, and a primary result output. Each of the ALU stage is programmable to perform a computational operation on the first numeric input and/or the second numeric input of the ALU stage to generate the primary result output. The primary result output is provided to the next computational circuit block, which may select that primary result output as one of the numeric inputs to the ALU. For example, the primary result output of computational circuit block 210-1 is provided as an input to computational circuit block 210-2, and computational circuit block 210-2 may select the primary result output of computational circuit block 210-1 as one of the numeric inputs to the ALU stage of computational circuit block 210-2. Computational circuit block 210-2 can also select the primary result output of computational circuit block 210-1 to bypass the ALU stage and be outputted to the next computational circuit block 210-3 using the bypass circuitry.

Each of computational circuit blocks 210-1 to 210-N can be independently configured such that some or all of the ALU stages perform a different computational operation. Likewise, some or all of the ALU stages in the pipeline can be configured to perform the same computational operation. In some implementations, the multiplexors at the input interface of each computational circuit block can be independently configured to select any of the inputs that the computational circuit block receives. The bypass circuitry provided in each computational circuit block can also allow the computational circuit blocks in the pipeline to operate independently on different inputs.

For instance, a first set of inputs can flow into the first ALU stage of computational circuit block 210-1, and the result of the first ALU stage can flow into the second ALU stage of computational circuit block 210-2. The result of the second ALU stage of computational circuit block 210-2 can then be provided along a bypass path. For example, the bypass multiplexor of the next computational circuit block can select the primary output of computational circuit block 210-2, and provide the primary output of computational circuit block 210-2 along the bypass path down the pipeline to the subsequent computational circuit blocks. The primary output of computational circuit block 210-2 can be outputted by the bypass circuitry of the last computational circuit block 210-N.

Meanwhile, a second set of inputs can be provided along the bypass circuitry of computational circuit blocks 210-1 and 210-2. The input multiplexors for the ALU stage of the next computational circuit block can select this second set of inputs as the numeric inputs for the ALU. For example, the first input multiplexor and the second input multiplexor can select respective outputs of the bypass circuits of computational circuit block 210-2 to be used as the numeric inputs to the ALU circuit. The remaining ALU stages in the pipeline can operate on the result from this ALU circuit with the final result being outputted as the primary output of the last ALU stage of computational circuit block 210-N.

Hence, in this specific example, the first two ALU stages operate together on a first set of inputs, and the remaining ALU stages operate together on a second set of inputs. The bypass circuitry allows the two groups of ALU stages to operate independently from each other. In other scenarios, it's also possible to have two groups of ALU stages operate independently, and the results can be combined at a later ALU stage. These are just a few examples of the flexibility that the bypass circuitry provides on different ways that the pipeline can be configured and utilized.

In some implementations, the ALU pipeline can be designed to have no stalls such that data elements can be streamed into the pipeline at every clock cycle to maximize throughput. In other words, the pipeline can be designed to process a new data element at every clock cycle. In some scenarios, a data bubble (e.g., clock cycle with no valid data) may occur in the data stream inputted into the pipeline. This may occur, for example, if the memory providing the data elements to the pipeline or the memory being written with the computational result outputted from the pipeline is busy or reaches a bandwidth limit, causing a temporary pause in the data flow. In such scenarios, a nop (no operation) instruction can be executed by the ALU pipeline in each clock cycle of the temporary pause until the data stream resumes.

Certain computations may require multiple operations to be performed on a previous computational result to derive to an updated computational result from a new data element being streamed into the pipeline. For computations that may have multicycle feedback loops, the computational circuit block feeding back the running computational results can be implemented with multiple feedback registers. When a data bubble is encountered, the computational circuit block can safely maintain the separate running computational results, for example, by using a first feedback register to store the first running computation for the odd sequenced data elements, and a second feedback register to store the second running computation for the even sequenced data elements. During operation, the enables for the two feedback registers can be alternately toggled such that one feedback register tracks the odd running computation, and the other feedback register tracks the even running computation. When a pause in the data stream is encountered, the enable signals to the two feedback registers can be disabled such that the two running computations are retained and stored separately in the two feedback registers. When the data stream is restarted, the alternate toggling of the enables for the two feedback registers can be resumed to continue tracking the two running computations in the separate feedback registers. Hence, by having multiple feedback registers to maintain and store respective running computational results, data bubbles in the data stream can be handled properly without causing the running computational results to go out of synch.

In addition to the computational circuit blocks 210-1 to 210-N, integrated circuit 200 may also include an input circuit 204 and an output circuit 206. Input circuit 204 is operable to provide input data selectable from multiple data sources 202 to the pipeline of computational circuit blocks 210-1 to 210-N. Data sources 202 may include data being read from a memory (e.g., a buffer memory storing tensor data elements), as well as other data sources. In some implementations, the data being read from memory can be provided by a memory read interface circuit via multiple virtual input ports, and the input circuit 204 can select one or more of the virtual input ports as a data source for the compute channel 250.

Other examples of data sources 202 may include a parameter table storing preloaded values, a pseudo-random number generator such as a linear feedback shift register, and/or a counter (e.g., that counts the number of input data elements). The selectable data sources 202 may also include a programmable constant value, a zero value, a floating-point one value, an integer one value, a value representing positive infinity, and/or a value representing negative infinity, etc. In some implementations, the selectable data sources 202 may also include a power of two value (e.g., 8, 16, 24, etc.) which can be used for shifting or masking operations, and/or a bit mask value for masking one or more bytes (e.g., 0xff, 0xff00, 0xff00000xff000000, 0xffff, 0xffff0000, 0xffffff00, 0xffffffff, etc.). Each of the multiplexors in the input circuit 204 can independently select the same or different data source to provide to the first computational circuit block 210-1.

At the end of the ALU pipeline, the last computational circuit block 210-N can be coupled to an output circuit 206. The output circuit 206 is operable to select between a primary output of the last computational circuit block 210-N and respective outputs of the bypass circuits of the last computation circuit block 210-N to provide as any of data outputs 208 to write to memory. In some implementations, output circuit 206 can be coupled to a memory write interface circuit, and data outputs 208 can be provided to virtual output ports of the memory write interface circuit. The memory write interface circuit can select data from one or more of the virtual output ports to write to memory. In some implementations the memory write interface circuit can be controlled to write output data to memory under certain prescribed conditions. For example, the compute channel can be configured to write output data to memory only when a predicate condition programmed in an ALU stage is met (e.g., the first numeric input of the designated ALU stage is equal to the second numeric input), or when a tensor subdimension overflows (e.g., write the data output to memory after every M number of data elements for a pooling operation, etc.).

Figure 3:
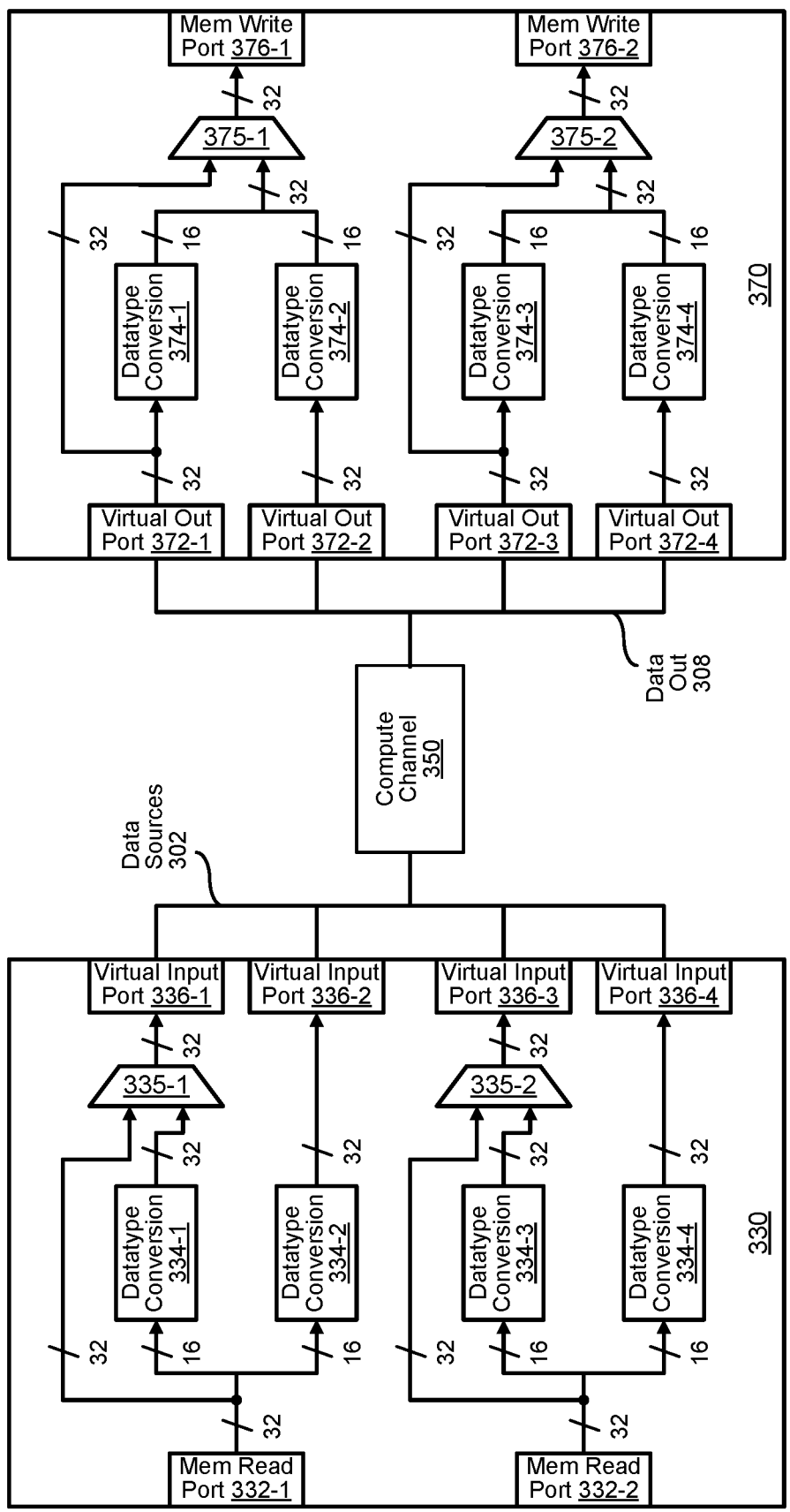
FIG. 3 illustrates a block diagram of an example of memory access interface circuits for a compute channel.

FIG. 3 illustrates a block diagram of an example of the memory access interfaces of a compute channel 350. Compute channel 350 can be implemented, for example, using integrated circuit 250. The memory access interfaces may include a memory read interface circuit 330 coupled to the input of compute channel 350 (e.g., coupled to input circuit 204), and a memory write interface circuit 370 coupled to the output of compute channel 370 (e.g., coupled to output circuit 206). In some implementations, the functionality of input circuit 204 can be integrated with memory read integrated circuit 330 (or vice versa). In some implementations, the functionality of output circuit 206 can be integrate with memory write interface circuit 370 (or vice versa).

Memory read interface circuit 330 includes multiple memory read ports such as memory read port 332-1 and memory read port 332-2. Each of the memory read ports is coupled to multiple virtual input ports that provide data to compute channel 350. For example, memory read port 332-1 is coupled to virtual input port 336-1 and virtual input port 336-2, and memory read port 332-2 is coupled to virtual input port 336-3 and virtual input port 336-4. The multiple memory read ports are operable to concurrently read data from different memory locations, and each memory read port is operable to provide an input data stream to one or more of the virtual input ports coupled to the memory read port. For example, memory read port 332-1 and memory read port 332-2 can concurrently read data from different locations of a memory. Memory read port 332-1 can provide an input data stream to virtual input port 336-1, or provide an input data stream to both virtual input port 336-1 and virtual input port 336-2. Similarly, memory read port 332-2 can provide an input data stream to virtual input port 336-3, or provide an input data stream to both virtual input port 336-3 and virtual input port 336-4.

Each of the memory read ports can concurrently read data of a certain bitlength in each clock cycle. For example, each of the memory read ports 332-1 and 332-2 can read 32-bits of data in each clock cycle. The data being read by each memory read port in a clock cycle can be a data element of the full bitlength datatype (e.g., a 32-bit data element such as 32-bit floating point (FP32) data element), or a concatenation of multiple data elements of a partial bitlength datatype (e.g., two half bitlength 16-bit data elements such as two 16-bit floating point (FP16) or 16-bit brain floating point (BF16) data elements). Depending on the datatype of the data elements being processed by compute channel 350 (e.g., FP32 tensor, or FP16/BP16 tensor), the data elements being read on a memory read port can be provided as an input data stream to a virtual input port, or be split into multiple data streams provided to respective virtual input ports. For example, if memory read port 332-1 is reading FP32 data elements, memory read port 332-1 can provide an input stream of FP32 data elements to virtual input port 336-1. If memory read port 332-2 is reading concatenation of FP16 or BF16 data elements, memory read port 332-1 can split the concatenated data elements being read in at each clock cycle, and provide a first input data stream of FP16/BF16 data elements (e.g., lower two bytes being read at each clock cycle) to virtual input port 336-1 and a second input data stream of FP16/BF16 data elements (e.g., upper two bytes being read at each clock cycle) to virtual input port 336-2.

In some implementations, the computational circuit blocks (e.g., ALUs) of compute channel 350 may operate on data elements in the full bitlength datatype. As such, when the data elements being read from memory is of a partial bitlength datatype, memory read interface circuit 330 may include a datatype conversion circuit associated with each virtual input port to convert a data element received from the corresponding memory read port in a partial bitlength datatype into a full bitlength datatype. For instance, memory read interface circuit 330 may include datatype conversion circuit 334-1 that performs datatype conversion for virtual input port 336-1, datatype conversion circuit 334-2 that performs datatype conversion for virtual input port 336-2, datatype conversion circuit 334-3 that performs datatype conversion for virtual input port 336-3, and datatype conversion circuit 334-4 that performs datatype conversion for virtual input port 336-4. By way of example, when memory read port 332-1 reads a concatenated data element containing two FP16 data elements, the lower two bytes corresponding to one FP16 data element can be provided to datatype conversion circuit 334-1 to convert the data element from FP16 to FP32, and the upper two bytes corresponding to the other FP16 data element can be provided to datatype conversion circuit 334-2 to convert the data element from FP16 to FP32. In this manner, memory read interface circuit 330 can read a stream of concatenated FP16 data elements on memory read port 332-1, split the stream into two input data streams, and covert the data elements to generate two FP32 input data streams for compute channel 350. Memory read interface circuit 330 can also include a multiplexor 335-1 for virtual input port 336-1 to select between an input data stream of data elements in the full bitlength datatype from memory read port 332-1, and an input data stream outputted from datatype conversion circuit 334-1 which contains data elements converted from a partial bitlength datatype into the full bitlength datatype. Memory read interface circuit 330 can similarly include a multiplexor 335-2 for virtual input port 336-3.

Memory write interface circuit 370 includes multiple memory write ports such as memory write port 376-1 and memory read port 376-2. Each of the memory write ports is coupled to multiple virtual output ports that can receive an output data stream from compute channel 350. For example, memory write port 376-1 is coupled to virtual output port 372-1 and virtual output port 372-2, and memory write port 376-2 is coupled to virtual output port 372-3 and virtual output port 372-4. The multiple memory write ports are operable to concurrently write data to different memory locations, and each memory write port is operable to receive an output data stream from one or more of the virtual output ports coupled to the memory write port. For example, memory write port 376-1 and memory read port 376-2 can concurrently write data to different locations of a memory. Memory write port 376-1 can receive an output data stream from virtual output port 372-1, or a concatenated data stream by concatenating data elements from virtual output port 372-1 and virtual output port 372-2. Similarly, memory write port 376-2 can received an output data stream from virtual input port 372-3, or a concatenated data stream by concatenating data elements from virtual output port 372-3 and virtual output port 372-4.

Each of the memory write ports can concurrently write data of a certain bitlength in each clock cycle. For example, each of the memory write ports 376-1 and 376-2 can write 32-bits of data in each clock cycle. The data being written by each memory write port in a clock cycle can be a data element of the full bitlength datatype (e.g., a 32-bit data element such as 32-bit floating point (FP32) data element), or a concatenation of multiple data elements of a partial bitlength datatype (e.g., two 16-bit data elements such as two 16-bit floating point (FP16) or 16-bit brain floating point (BF16) data elements). The datatype of the data elements being written to memory will depend on the datatype of the data elements that were originally read from memory and inputted into compute channel 350. For example, if the original data elements read from memory being inputted into compute channel 350 are FP32 data elements, then the memory write port will write FP32 data elements back to memory. If the original data elements read from memory being inputted into compute channel 350 are FP16 or BF16 data elements, then the memory write port will write a concatenation of FP16 or BF16 data elements back to memory.

In some implementations, the computational circuit blocks (e.g., ALUs) of compute channel 350 may output data elements in the full bitlength datatype. As such, memory write interface circuit 370 may include a datatype conversion circuit associated with each virtual output port to convert a data element received from compute channel 350 in a full bitlength datatype into a partial bitlength datatype. For instance, memory write interface circuit 370 may include datatype conversion circuit 374-1 that performs datatype conversion for virtual output port 372-1, datatype conversion circuit 374-2 that performs datatype conversion for virtual output port 372-2, datatype conversion circuit 374-3 that performs datatype conversion for virtual output port 372-3, and datatype conversion circuit 374-4 that performs datatype conversion for virtual output port 372-4.

By way of example, if the original tensor being processed by compute channel 350 is a FP16 tensor, compute channel 350 may provide an output data stream on virtual output port 372-1 and another output data steam on virtual output port 372-2. Although the data elements outputted from compute channel 350 are in the FP32 datatype, the data elements are converted back to FP16 datatype before being written to memory. Hence, the output data stream from virtual output port 372-1 can be converted back to FP16 datatype by datatype conversion circuit 374-1, and the output data stream from virtual output port 372-2 can be converted back to FP16 datatype by datatype conversion circuit 374-2. The two converted output data streams can then be concatenated into a concatenated data stream of concatenated data elements by concatenating a FP16 data element from the first output data stream with a FP16 data element from the second output data stream in each clock cycle. In other words, the lower two bytes of a concatenated data element being written to memory on memory write port 376-1 corresponds to a FP16 data element provided from datatype conversion circuit 374-1, and the upper two bytes corresponds to a FP16 data element provided from datatype conversion circuit 374-2.

If the original tensor processed by compute channel 350 is a FP32 tensor, compute channel 350 may provide an output data stream of FP32 data elements on virtual output port 372-1. Since the original tensor is a FP32 tensor, no datatype conversion is needed, and the output data stream can be provided from virtual output port 372-1 to memory write port 376-1 for writing to memory. Memory write interface circuit 370 may include a multiplexor 375-1 for memory write port 376-1 to select between the output data stream with data elements at the full bitlength datatype from virtual output port 372-1, and a concatenated output data stream formed by concatenating two data streams with data elements at the partial bitlength datatype outputted by respective datatype conversion circuits 374-1 and 374-2. Memory write interface circuit 370 may similarly include a multiplexor 375-2 for memory write port 376-2.

By having a memory read circuit 330 with multiple memory read ports and multiple virtual input ports coupled to each memory read port, and a memory read circuit 330 with multiple memory write ports and multiple virtual output ports coupled to each memory write port, various throughput increase modes can be implemented in compute channel 350 to concurrently process multiple data streams. A computation can be performed on multiple input data streams using respective subsets of computational circuit block(s) in the pipeline to generate multiple output data streams. Because each computational circuit block in the pipeline of compute channel 350 has bypass circuitry to feed-forward data from an input of the computational circuit block to an output of the computational circuit block, the computation circuit blocks can be grouped into different subsets to independently operate on different input data streams. Hence, compute channel 350 can perform a computation on multiple input data streams using respective subsets of computational circuit block(s) in the pipeline to generate multiple output data streams.

It should be noted that although the example in FIG. 3 is shown as having two virtual ports coupled to a memory access port to perform splitting of a data stream of 32-bit data elements into two data streams of 16-bit data elements, and/or merging of two data streams of 16-bit data elements into a data stream of 32-bit data elements, other implementations may include a different ratio of virtual ports to memory access port. For example, a ratio of four to one can be used to split/merge a data stream of 32-bit data elements with four data streams of 8-bit data elements. Furthermore, although the full bitlength datatype has been described as 32-bits, the full bitlength datatype in other implementations can have a different number of bits (e.g., 64 bits, etc.), and the full bitlength datatype can be any integer multiple of the partial bitlength datatype. Moreover, the number of memory read/write ports can be increased to increase the number of full bitlength data streams that can be concurrently read and/or written to memory. Various examples of throughput increase modes will be described with reference to FIGS. 4A to 4D.

Figure 4A:
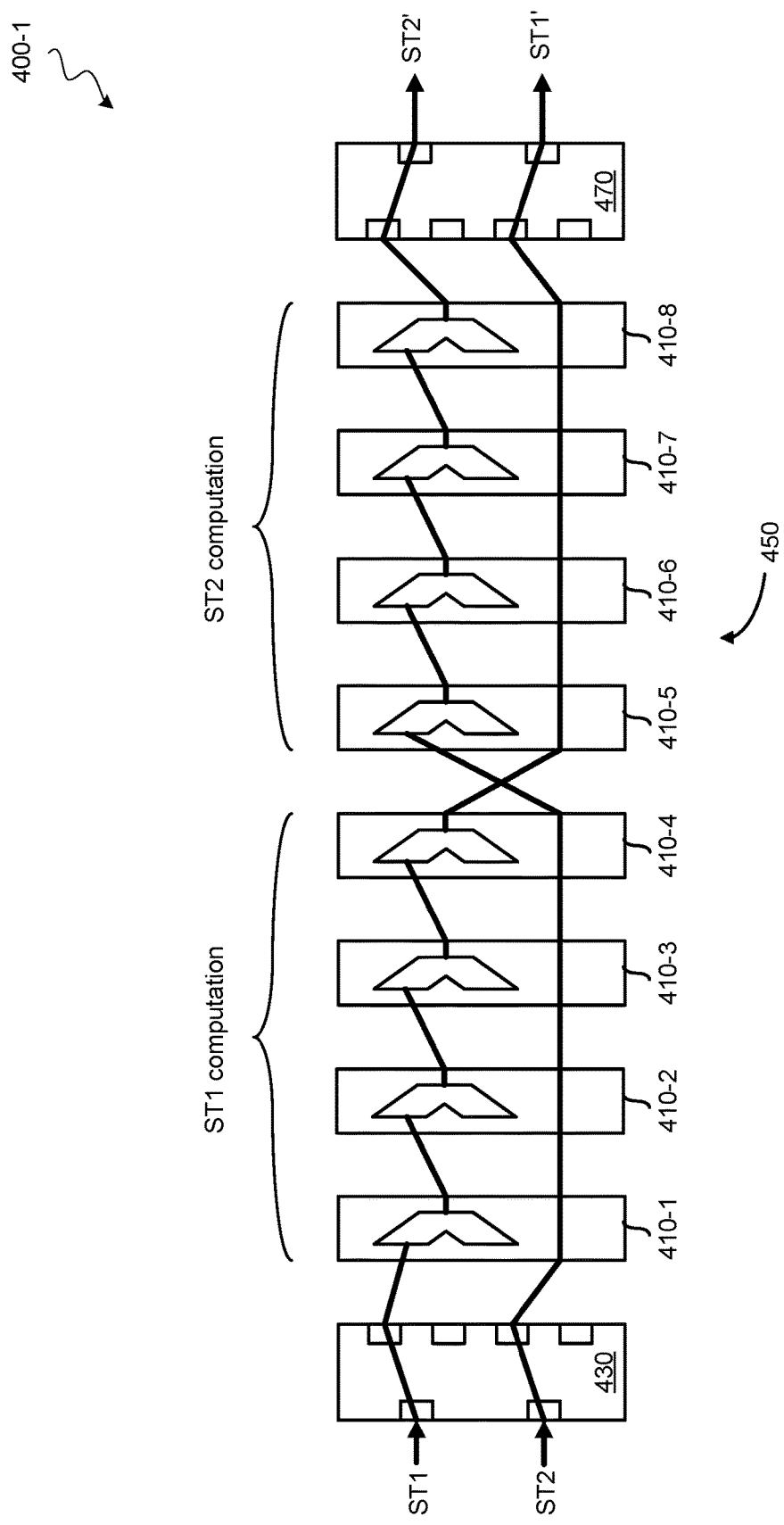
FIG. 4A illustrates a conceptual diagram of an example of operating a compute channel in a throughput increase mode.

FIG. 4A illustrates a conceptual diagram 400-1 of an example of operating a compute channel 450 in a multiport mode. This throughput increase mode operates on full bitlength datatype tensors or on partial bitlength datatype tensors, and accesses the memory using multiple ports. In the example shown, compute channel 450 includes eight computational circuit block 410-1 to 410-8. Each computational circuit block can be implemented, for example, using computational circuit block 100. Compute channel 450 is coupled to a memory read interface circuit 430 and a memory write interface circuit 470. Memory read interface circuit 430 can be implemented, for example, using memory read interface circuit 330, and memory write interface circuit 470 can be implemented, for example, using memory write interface circuit 370. For ease of illustration, certain details of these blocks have been omitted, and compute channel 450 is shown without an input circuit (e.g., input circuit 204) and without an output circuit (e.g., output circuit 206). It should also be understood that compute channel 450 may include more or fewer number of computational circuit blocks.

By way of example, suppose a certain computation uses four computational circuit blocks coupled in series to perform. To perform such a computation on a tensor in a normal mode of operation, the data elements can be inputted serially into compute channel 450, and the computation can be performed on each data element using the first four computational circuit blocks 410-1 to 410-4. The output of the fourth computational circuit block 410-4 can then be shifted out of the pipeline (e.g., using the bypass circuitry) and be written to memory. However, the four subsequent computational circuit blocks 410-5 to 410-8 are not being used for actual computations, and thus compute channel 450 is underutilized.

To increase the throughput of the compute channel, the data elements of the input tensor can be split into multiple input data streams. The input tensor can be split into multiple input subtensors with each of the input subtensors corresponding to one of the input data streams. The input subtensors can be read concurrently from memory on respective memory read ports of the memory read interface circuit of the compute channel to input multiple input data streams in parallel into the compute channel. The multiple input data streams can be provided to respective subsets of computational circuit blocks using the bypass circuitry of the computational circuit blocks, and each subset of computational circuit blocks can perform the computation on an input data stream to generate a corresponding output data stream. Hence, multiple output data streams can be generated. The multiple output data streams can be written concurrently on respective memory write ports of the memory write interface of the compute channel in parallel to write the output tensor to the memory.

In some implementations, the input tensor can be represented using tensor dimensions that define a memory access pattern to read the data elements of the tensor from memory. For instance, the input tensor can be represented as a four-dimensional tensor, with the lower dimension defining the stride for the next higher dimension. To split the input tensor, the highest dimension that is divisible by the number of input data streams to generate is selected, and the input tensor can be split into the subtensors along that dimension. The memory read logic can then use the subtensor dimensions to access the memory as if independent tensors are being read from memory. If the selected dimension is not evenly divisible by the number of input data streams to generate, one or more of the input data streams may be longer than others, and compute channel 450 can simply continue to process the longer input data stream until completion, and not write out the output of the finished data stream. The memory write logic can write the output subtensors in a similar manner using the subtensor dimensions to store the data elements in the proper location in memory to resemble the output tensor. In some implementations, if the input tensor shape and the output tensor shape are different, and the input tensor and output tensor are not divisible in a corresponding manner, the normal mode of operation is used instead of the throughput increase mode. This can simplify the memory access logic by ensuring that the memory read and write logic will access the memory using similar access patterns when using the throughput increase mode.

Referring back to the example of FIG. 4A, if memory read interface circuit 430 has two memory read ports as shown, the input tensor can be split into two subtensors ST1 and ST2. The two memory read ports of memory read interface circuit 430 concurrently read a data element from each of subtensors ST1 and ST2 in each clock cycle, and the data elements from subtensors ST1 and ST2 are provided in parallel to respective virtual input ports.

Subtensor ST1 is inputted into the subset of computational circuit blocks 410-1 to 410-4, which is configured to perform the computation on the data elements of subtensor ST1 to generate an output subtensor ST1'. The output of computational circuit block 410-4 is provided along the bypass circuitry of computational circuit blocks 410-5 to 410-8 to a virtual output port of memory write interface circuit 470, and the virtual output port provides the output data elements of subtensor ST1' to a memory write port for writing to memory.

Subtensor ST2 is provided along the bypass circuitry of computational circuit blocks 410-1 to 410-4 to feed forward subtensor ST2 to the subset of computational circuit blocks 410-5 to 410-8. The subset of computational circuit blocks 410-5 to 410-8 is configured to perform the computation on the data elements of subtensor ST2 to generate an output subtensor ST2'. The output of computational circuit block 410-8 is provided to a virtual output port of memory write interface circuit 470, and the virtual output port provides the output data elements of subtensor ST2' to another memory write port for writing to memory. The two output data streams for subtensor ST1' and ST2' can be written on respective memory write ports in parallel to write the output tensor to memory.

Hence, in the example of the multiport mode shown in FIG. 4A, a twofold (2×) throughput increase can be achieved by using dual memory access ports. This multiport mode can be used for full bitlength datatypes. This multiport mode can also be used for partial bitlength datatypes, for example, when the partial bitlength data elements are not stored in a concatenated manner in memory. When operating on partial bitlength data elements, the data elements can be converted to the full bitlength datatype before being inputted into the compute channel, and the output data elements can be converted back to the partial bitlength datatype before being written to memory. A similar throughput increase can be achieved for computations that uses only one, two, or three computational circuit blocks, although some of the compute channel may remain underutilized. To further increase utilization of the compute channel in such scenarios, the number of memory access ports can be increased to provide additional input data streams.

Figure 4B:
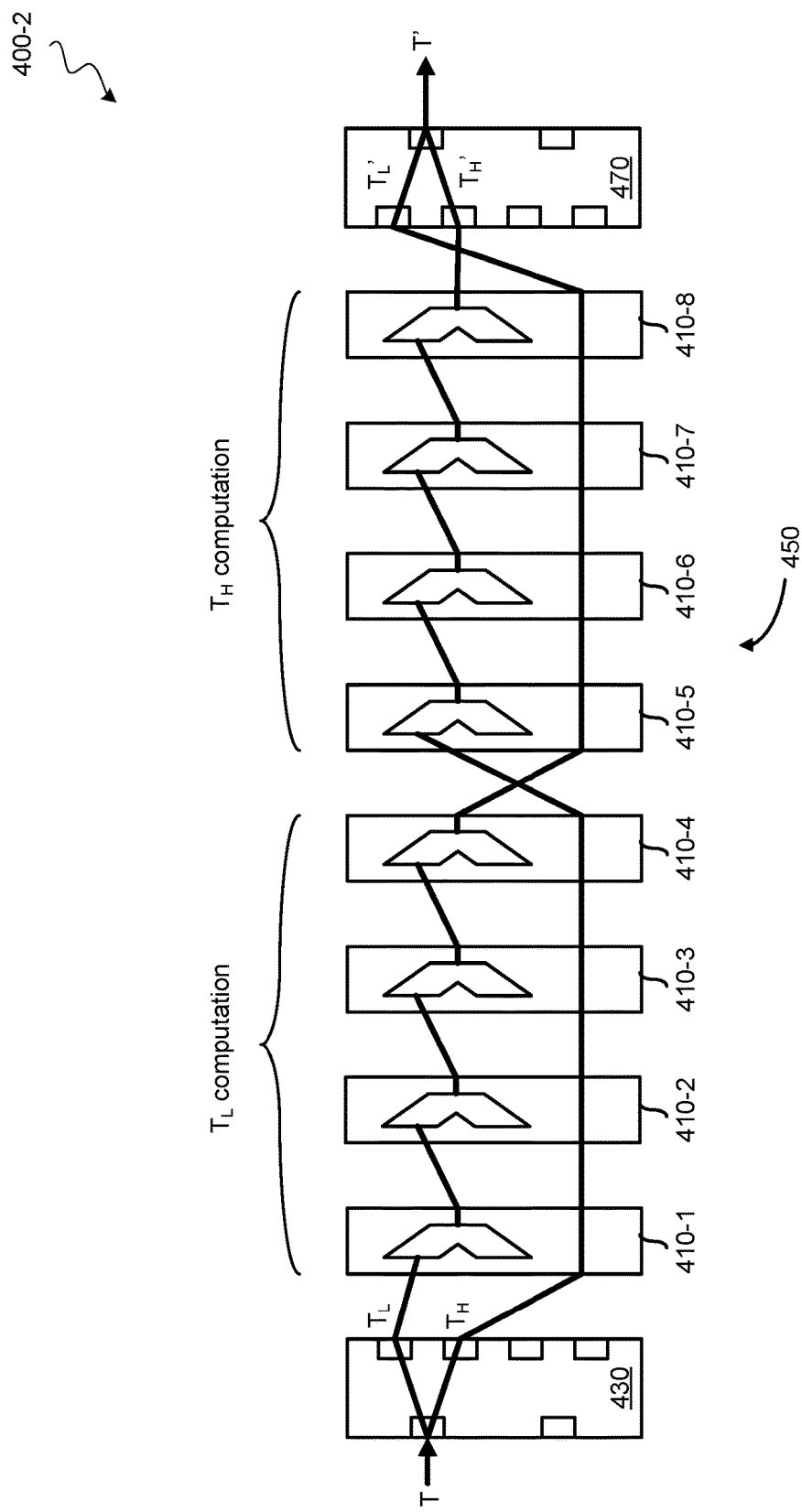
FIG. 4B illustrates a conceptual diagram of another example of operating a compute channel in a throughput increase mode.

FIG. 4B illustrates a conceptual diagram 400-2 of an example of operating a compute channel 450 in a single port partial bitlength datatype mode. This throughput increase mode operates on partial bitlength datatype tensors and accesses the memory using a single read and a single write port. Similar to FIG. 4A, the computation in the example of FIG. 4B uses four computational circuit blocks coupled in series.

To split the data elements of the input tensor into multiple input data streams, concatenated data elements of the input tensor in the partial bitlength datatype is read from the memory on a memory read port of the memory read interface of the compute channel in each clock cycle. The concatenated data elements are split into respective input data streams in the memory read interface circuit, and each data element is converted from the partial bitlength datatype into a full bitlength datatype for the computational circuit blocks. The multiple input data streams containing the converted input data elements can be provided to respective subsets of computational circuit blocks using the bypass circuitry of the computational circuit blocks, and each subset of computational circuit blocks can perform the computation on an input data stream to generate a corresponding output data stream. Hence, multiple output data streams can be generated. Each output data element of the output data streams is converted back into the partial bitlength datatype, and the converted output data elements from the respective output data streams are concatenated into concatenated output data elements to form a concatenated data stream. The concatenated data stream can then be written to the memory on a memory write port of a memory write interface of the compute channel.

Referring to FIG. 4B, a memory read port of memory read interface circuit 430 reads a concatenated data element of the input tensor T from memory in each clock cycle. The concatenated data element includes multiple partial bitlength data elements. For example, if the full bitlength datatype is a 32-bit datatype (e.g., FP32) and the memory read port is capable of reading the full bitlength in each clock cycle, the concatenated data element read in each clock cycle can include two 16-bit data elements (e.g., two FP16 or two BP16 data elements). The concatenated data elements of the input tensor T read on a memory read port are split into separate data streams TL and TH. For example, continuing with the 32-bit full bitlength datatype example, the lower two bytes of each concatenated data element corresponding to a 16-bit data element can be provided as input data stream TL to a virtual input port of the memory read interface circuit 430, and the upper two bytes of each concatenated data element corresponding to another 16-bit data element can be provided as input data stream TH to another virtual input port of the memory read interface circuit 430. Each of the 16-bit data element can be converted to a 32-bit data element (e.g., FP16 to FP32, or BP16 to FP32).

Input data stream TL is inputted into the subset of computational circuit blocks 410-1 to 410-4, which is configured to perform the computation on the data elements of data stream TL to generate an output data stream TL'. The output of computational circuit block 410-4 is provided along the bypass circuitry of computational circuit blocks 410-5 to 410-8 to a virtual output port of memory write interface circuit 470. Input data stream TH is provided along the bypass circuitry of computational circuit blocks 410-1 to 410-4 to feed forward input data stream TH to the subset of computational circuit blocks 410-5 to 410-8. The subset of computational circuit blocks 410-5 to 410-8 is configured to perform the computation on the data elements of input data stream TH to generate an output data stream TH'. The output of computational circuit block 410-8 is provided to a virtual output port of memory write interface circuit 470.

The output data elements received on the virtual output ports from compute channel 450 are in the full bitlength datatype. As such, memory write interface circuit 470 converts the output data elements of output data streams TL' and TH' from the full bitlength datatype back into the partial bitlength datatype (e.g., FP32 to FP16, or FP32 to BP16). The converted output data elements from output data streams TL' and TH' are concatenated into concatenated output data elements to form a concatenated data stream T'. For example, each concatenated output data element in concatenated output data stream T' includes a data element from TL' and a data element from TH'. The concatenated output data stream T' is then written on a memory write port to write the output tensor to memory.

Hence, in the example of the single port partial bitlength datatype mode shown in FIG. 4B, a twofold (2×) throughput increase can be achieved with partial bitlength datatype while using a single memory access port. A similar throughput increase can be achieved for computations that uses only one, two, or three computational circuit blocks, although some of the compute channel may remain underutilized. To further increase utilization of the compute channel in such scenarios, the other memory read/write port can be used as shown with FIG. 4C.

Figure 4C:
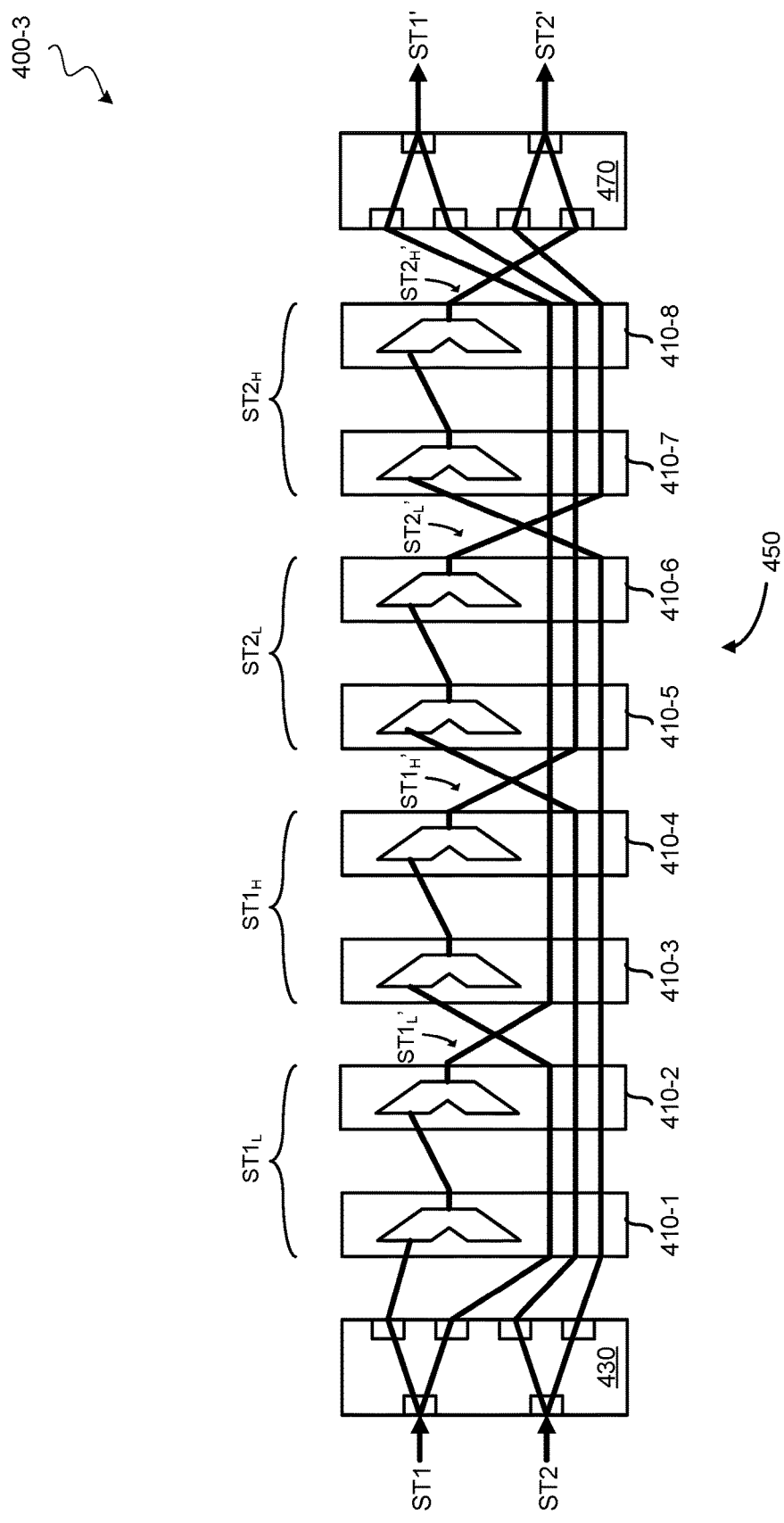
FIG. 4C illustrates a conceptual diagram of a further example of operating a compute channel in a throughput increase mode.

FIG. 4C illustrates a conceptual diagram 400-3 of an example of operating a compute channel 450 in a multiport partial bitlength datatype mode. This throughput increase mode operates on partial bitlength datatype tensors and accesses the memory using multiple ports. To illustrate the throughput increase, the example computation shown in FIG. 4C uses two computational circuit blocks coupled in series. A common tensor operation that uses two computational circuit blocks coupled in series is a tensor scalar operation in which an ALU is used to scale each data element of a tensor, and a second ALU is used to apply an offset to each scaled data element of tensor outputted by the first ALU.

Similar to FIG. 4A, the input tensor is split into multiple input data streams by splitting the input tensor into multiple input subtensors. However, because the data elements being processed are of a partial bitlength datatype, concatenated data elements of the input subtensors are concurrently read from the memory on respect memory read ports of the memory read interface of the compute channel at each clock cycle to input the subtensors in parallel into the compute channel. The concatenated data elements read on each memory read port are split into respective input data streams in the memory read interface circuit, and each data element is converted from the partial bitlength datatype into a full bitlength datatype for the computational circuit blocks. The multiple input data streams containing the converted input data elements can be provided to respective subsets of computational circuit blocks using the bypass circuitry of the computational circuit blocks, and each subset of computational circuit blocks can perform the computation on an input data stream to generate a corresponding output data stream. Hence, multiple output data streams can be generated. Each output data element of the output data streams is converted back into the partial bitlength datatype, and the converted output data elements from different output data streams are concatenated into concatenated output data elements to form multiple concatenated data streams. The concatenated output data streams can then be written to the memory concurrently on respective memory write ports of a memory write interface of the compute channel in parallel to write the output tensor to memory.

Referring to the example of FIG. 4C, the first memory read port of memory read interface circuit 430 reads a concatenated data element of input subtensor ST1 from memory in each clock cycle concurrently with the second memory read port reading a concatenated data element of input subtensor ST2. The concatenated data element includes multiple partial bitlength data elements. For example, if the full bitlength datatype is a 32-bit datatype (e.g., FP32) and the memory read port is capable of reading the full bitlength in each clock cycle, the concatenated data element read in each clock cycle by each memory read port can include two 16-bit data elements (e.g., two FP16 or two BP16 data elements). The concatenated data elements of the input subtensor ST1 read on the first memory read port are split into separate input data streams $ST1_L$ (e.g., lower two bytes) and $ST1_H$ (e.g., upper two bytes), and similarly, the concatenated data elements of the input subtensor ST2 read on the second memory read port are split into separate input data streams $ST2_L$ (e.g., lower two bytes) and $ST2_H$ (e.g., upper two bytes). Hence, four input data streams of partial bitlength data elements are generated. Each of the partial bitlength data elements in each of the four input data streams $ST1_L$, $ST1_H$, $ST2_L$, and $ST2_H$ can be converted to a full bitlength datatype (e.g., FP16 to FP32, or BP16 to FP32) in the memory read interface circuit 430.

Input data stream $ST1_L$ is inputted into the subset of computational circuit blocks 410-1 to 410-2, which is configured to perform the computation (e.g., tensor scalar) on the data elements of data stream $ST1_L$ to generate an output data stream $ST1_L'$. The output of computational circuit block 410-2 is provided along the bypass circuitry of computational circuit blocks 410-3 to 410-8 to a first virtual output port of memory write interface circuit 470. Input data stream $ST1_H$ is provided along the bypass circuitry of computational circuit blocks 410-1 to 410-2 to feed forward input data stream $ST1_H$ to the subset of computational circuit blocks 410-3 to 410-4. The subset of computational circuit blocks 410-3 to 410-4 is configured to perform the computation (e.g., tensor scalar) on the data elements of data stream $ST1_H$ to generate an output data stream $ST1_H'$. The output of computational circuit block 410-4 is provided along the bypass circuitry of computational circuit blocks 410-5 to 410-8 to a second virtual output port of memory write interface circuit 470.

Input data stream $ST2_L$ is provided along the bypass circuitry of computational circuit blocks 410-1 to 410-4 to feed forward input data stream $ST2_L$ to the subset of computational circuit blocks 410-5 to 410-6. The subset of computational circuit blocks 410-5 to 410-6 is configured to perform the computation (e.g., tensor scalar) on the data elements of data stream $ST2_L$ to generate an output data stream $ST2_L'$. The output of computational circuit block 410-6 is provided along the bypass circuitry of computational circuit blocks 410-7 to 410-8 to a third virtual output port of memory write interface circuit 470. Input data stream $ST2_H$ is provided along the bypass circuitry of computational circuit blocks 410-1 to 410-6 to feed forward input data stream $ST2_H$ to the subset of computational circuit blocks 410-7 to 410-8. The subset of computational circuit blocks 410-7 to 410-8 is configured to perform the computation (e.g., tensor scalar) on the data elements of data stream $ST2_H$ to generate an output data stream $ST2_H'$. The output of computational circuit block 410-8 is provided to a fourth virtual output port of memory write interface circuit 470. Accordingly, four output data streams are generated from four input data streams in this example.

The output data elements received on the four virtual output ports from compute channel 450 are in the full bitlength datatype. As such, memory write interface circuit 470 converts the output data elements of the four output data streams from the full bitlength datatype back into the partial bitlength datatype (e.g., FP32 to FP16, or FP32 to BP16). The converted output data elements from output data streams $ST1_L'$ and $ST1_H'$ are concatenated into concatenated output data elements to form a concatenated data stream ST1'. The converted output data elements from output data streams $ST2_L'$ and $ST2_H'$ are concatenated into concatenated output data elements to form a concatenated data stream ST2'. The two output data streams for subtensor ST1' and ST2' can be written on respective memory write ports in parallel to write the output tensor to memory.

Hence, in the example of the multiport partial bitlength datatype mode shown in FIG. 4C, a fourfold (4×) throughput increase can be achieved with partial bitlength datatype by using dual memory access ports. For computations that may need additional computational circuit blocks to perform, the number of computational circuit blocks in compute channel 450 can be increased to achieve similar throughput improvement.

Figure 4D:
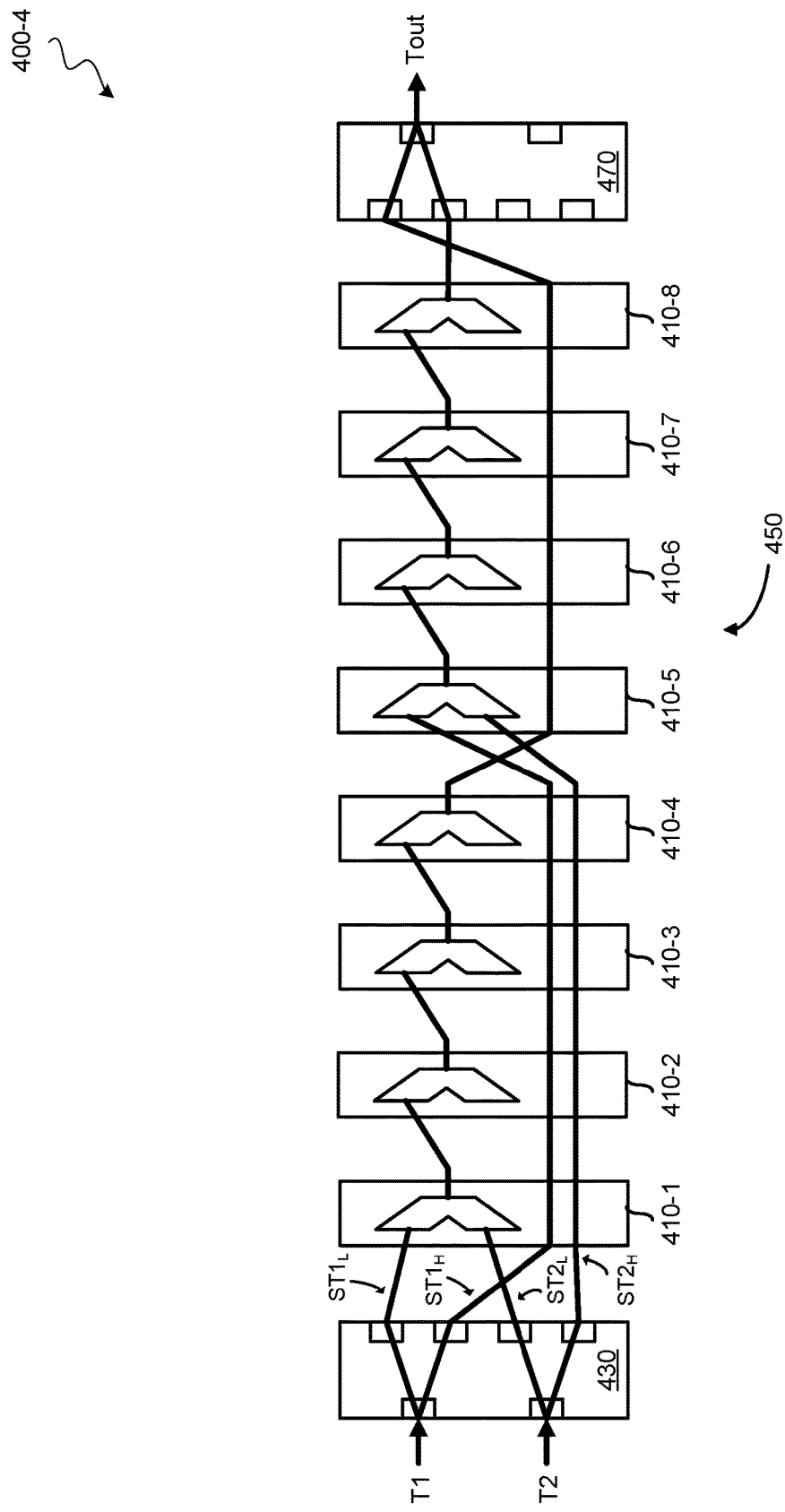
FIG. 4D illustrates a conceptual diagram of an additional example of operating a compute channel in a throughput increase mode.

FIG. 4D illustrates a conceptual diagram 400-4 of another example of operating a compute channel 450 in a multiport partial bitlength datatype mode. In this example, the computation being performed operates on the partial bitlength data elements of two input tensors to generate an output tensor. For instance, each data element of tensor T1 can be added to each data element of tensor T2 in one computational circuit block. For some computations, the result can be modified using additional computational circuit blocks to generate an output tensor Tout. In the example shown, the computation uses four computational circuit blocks, but other computations can use less than four computational circuit blocks.

Because the data elements being processed are of a partial bitlength datatype, concatenated data elements of a first input tensor are read from the memory on a memory read port of the memory read interface of the compute channel at each clock cycle. Concurrently, concatenated data elements of a second input tensor are read from the memory on another memory read port of the memory read interface of the compute channel at each clock cycle. The concatenated data elements read on each memory read port are split into respective input data streams in the memory read interface circuit, and each data element is converted from the partial bitlength datatype into a full bitlength datatype for the computational circuit blocks. A first input data stream originating from the first input tensor and a first input data stream originating from the second input tensor are provided to a computational circuit block, and the result can optionally be provided to additional computational circuit blocks to generate a first output data stream. A second input data stream originating from the first input tensor and a second input data stream originating from the second input tensor are provided to another computational circuit block, and the result can optionally be provided to additional computational circuit blocks to generate a second output data stream. Each output data element of the two output data streams is converted back into the partial bitlength datatype, and the converted output data elements from the output data streams are concatenated into concatenated output data elements to form a concatenated data stream. The concatenated output data stream is then written to the memory on a memory write port of a memory write interface of the compute channel as the output tensor.

Referring to the example of FIG. 4D, the first memory read port of memory read interface circuit 430 reads a concatenated data element of input tensor T1 from memory in each clock cycle concurrently with the second memory read port reading a concatenated data element of input tensor T2. The concatenated data element includes multiple partial bitlength data elements. For example, if the full bitlength datatype is a 32-bit datatype (e.g., FP32) and the memory read port is capable of reading the full bitlength in each clock cycle, the concatenated data element read in each clock cycle by each memory read port can include two 16-bit data elements (e.g., two FP16 or two BP16 data elements). The concatenated data elements of the input tensor T1 read on the first memory read port are split into separate input data streams $ST1_L$ (e.g., lower two bytes) and $ST1_H$ (e.g., upper two bytes), and similarly, the concatenated data elements of the input tensor T2 read on the second memory read port are split into separate input data streams $ST2_L$ (e.g., lower two bytes) and $ST2_H$ (e.g., upper two bytes). Hence, four input data streams of partial bitlength data elements are generated. Each of the partial bitlength data elements in each of the four input data streams $ST1_L$, $ST1_H$, $ST2_L$, and $ST2_H$ can be converted to a full bitlength datatype (e.g., FP16 to FP32, or BP16 to FP32) in the memory read interface circuit 430.

Input data stream $ST1_L$ and input data stream $ST2_L$ are inputted into the computational circuit blocks 410-1, which is configured to perform a computation on a data element from input data stream $ST1_L$ with a data element from input data stream $ST2_L$ (e.g., adding the two data elements). The output of computational circuit block 410-1 is provided to computation circuit blocks 410-2 to 410-3 for further modification. The output of computational circuit block 410-3 is then provided along the bypass circuitry of computational circuit blocks 410-5 to 410-8 to a first virtual output port of memory write interface circuit 470. Input data stream $ST2_H$ and input data stream $ST2_H$ are provided along the bypass circuitry of computational circuit blocks 410-1 to feed forward the input data streams to computational circuit blocks 410-5. Computational circuit block 410-5 is configured to perform a computation on a data element from input data stream $ST1_H$ with a data element from input data stream $ST2_H$ (e.g., adding the two data elements). The output of computational circuit block 410-5 is provided to computation circuit blocks 410-6 to 410-8 for further modification. The output of computational circuit block 410-8 is then provided to a second virtual output port of memory write interface circuit 470.

The output data elements received on the two virtual output ports from compute channel 450 are in the full bitlength datatype. As such, memory write interface circuit 470 converts the output data elements of the two output data streams from the full bitlength datatype back into the partial bitlength datatype (e.g., FP32 to FP16, or FP32 to BP16). The converted output data elements from the two output data streams are concatenated into concatenated output data elements to form a concatenated output data stream Tout, and the concatenated output data stream Tout can be written on a memory write port of the memory write interface circuit 470 to write the output tensor to memory.

Hence, in the example of the multiport partial bitlength datatype mode shown in FIG. 4D, a twofold (2×) throughput increase can be achieved with performing computations involving two input tensors with partial bitlength datatype. To further increase utilization of the compute channel, the number of memory access ports can be increased to provide additional input data streams.

Figure 5:
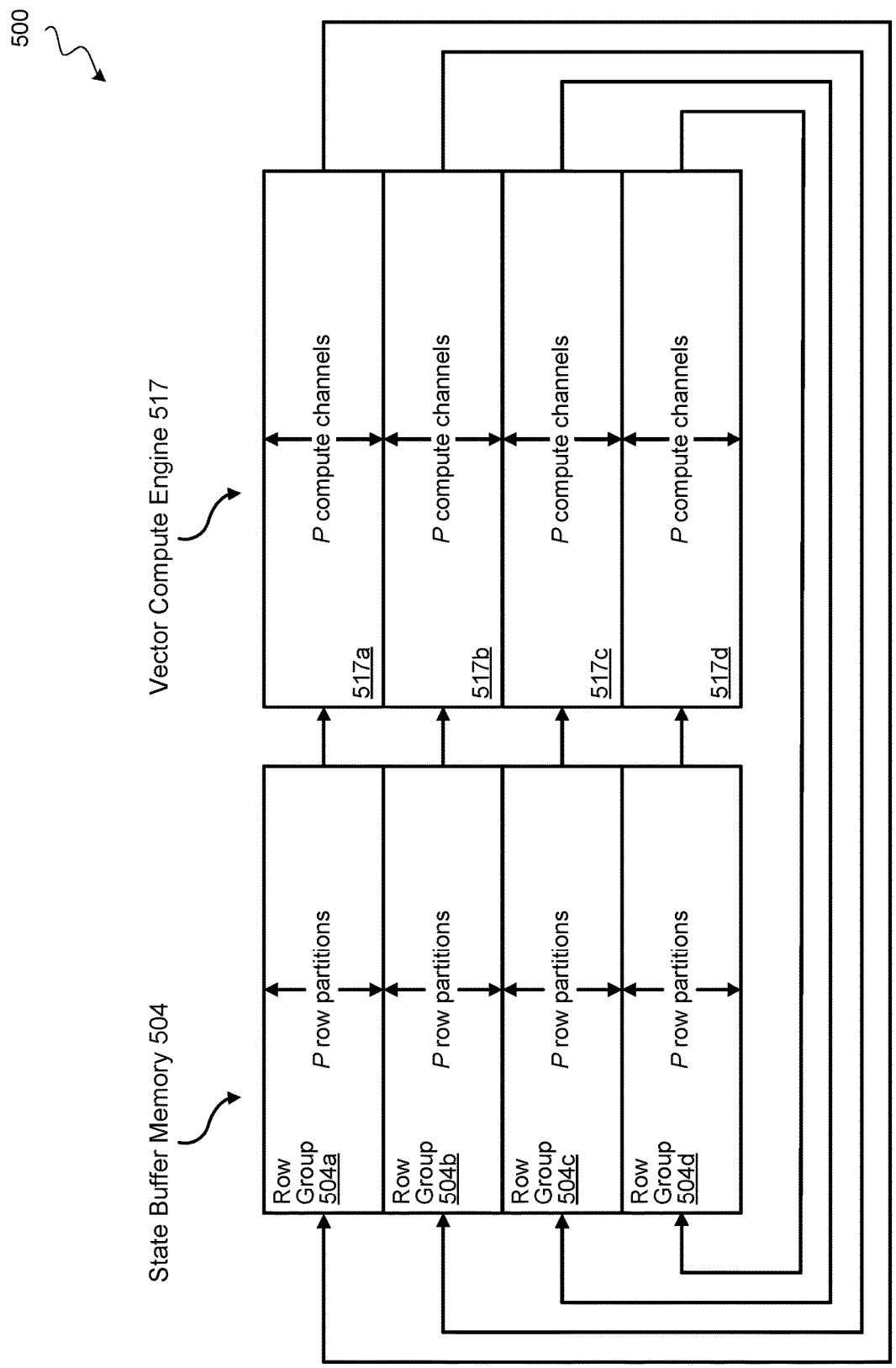
FIG. 5 illustrates a block diagram of an example of a portion of an integrated circuit device that includes a vector compute engine.

FIG. 5 illustrates a block diagram of an example of a portion of a neural network accelerator 500 that includes a vector compute engine 517. Neural network accelerator 500 may include other components not specifically shown such as a processing engine (PE) array (e.g., a systolic array tailored for matrix multiplication operations), a result buffer for storing outputs of the PE array, and/or other compute engines. Vector compute engine 517 may include multiple vector compute banks. In the example shown, vector compute engine 517 has four vector compute banks 517a to 517d. Each of the vector compute banks 517a to 517d may include P number of compute channels. Each compute channel can be implemented, for example, using integrated circuit 250, and may include a computational pipeline of ALU circuits coupled in series. Although not shown, each compute channel can also be coupled to a memory read interface circuit (e.g., memory read interface circuit 330) and a memory write interface circuit (e.g., memory write interface circuit 370) to interface with memory such as state buffer memory 504.

In some implementations, state buffer memory 504 can be an on-chip memory, and may act as a cache to store tensors or matrices for neural network accelerator 500 to process. For example, state buffer memory 504 may store tensors representing input data such as feature maps, weight values, and/or intermediate results of in-progress computations of a neural network. State buffer memory 504 may include multiple row partitions organized into row groups. In the example shown, state buffer memory 504 has four row groups 504a to 504d, and each of the row groups includes P number of row partitions. Hence, if state buffer memory 504 has 128 row partitions, then each row group may have 52 row partitions.

Vector compute engine 517 may read data from the row partitions of state buffer memory 504, and may include the same number of compute channels as the number of row partitions. For example, if there are 128 row partitions in state buffer memory 504, vector compute engine 517 may include 128 compute channels such that the data from each row partition can be processed by a corresponding compute channel. The data being inputted to a compute channel may correspond to a vector/tensor stored in state buffer memory 504. By having multiple compute channels, vector compute engine 517 can process multiple vectors/tensors in parallel.

The vector compute banks 517a to 517d are coupled to respective row groups 204a to 204d of state buffer memory 504. Hence, each vector compute bank processes data from a corresponding row group. As shown in FIG. 5, the output of each vector compute bank can be written back to the corresponding row group of state buffer memory 504. Each of the vector compute banks 517a to 517d can be configured independently from each other to process data from their respective row groups 504a to 504d. Vector compute banks 517a to 517d (or a subset thereof) may also operate collectively to process data from a tensor that spans multiple row groups.

A compute channel in vector compute engine 517 may perform certain computations on the data elements read from a row partition of state buffer memory 504. For example, the compute channel may count the number of data elements being streamed into the compute channel, calculate a mean and/or a variance of the data elements, and write back the count, mean, and/or variance values to the corresponding row partition of state buffer memory 504. Such computations can then be used to perform tensor normalization or tensor reduction. For example, the computed mean and/or variance can be used to scale and/or offset each data element being streamed into the compute channel, and write back the modified data elements to the corresponding row partition of state buffer memory 504. Other types of computations that a compute channel may perform can include performing a pooling operation to down-sample a tensor, finding the maximum/minimum value, and/or sorting the data elements in ascending/descending order, etc. before writing back the data elements to the corresponding row partition of state buffer memory 504

The compute channels in vector compute engine 517 can operate in parallel and generate outputs in parallel. Each of the parallel outputs generated by the compute channels can be generated from a corresponding vector/tensor inputted into vector compute engine 517. The output generated from a compute channel can be an output vector/tensor generated by applying an elementwise operation to each element of the vector/tensor inputted into the compute channel. In other words, when a vector/tensor of T elements is streamed into a compute channel, the compute channel may output T number of elements processed by the compute engine. Such operation can be used, for example, to scale and/or apply an offset to each of the data elements streamed into the compute engine. The output of a compute channel can also be one or more output values generated by performing one or more computations on a combination of data elements of the vector/tensor inputted into the compute channel. For example, the output value(s) can be a mean computed over the data elements streamed into the compute channel, and/or a variance computed over the elements streamed into the compute channel. In some implementations, the compute channel may output the mean, variance, and count of the elements inputted into the compute channel from a single pass of the elements steamed into the compute channel.

In the context of executing a neural network, vector compute engine 517 can be used to complement and/or offload computations from the PE array (not shown) of neural network accelerator 500. For example, vector compute engine 517 can be used to perform tensor normalization of a tensor stored in state buffer memory 504 prior to inputting the tensor into the PE array for matrix multiplication operations. Although vector compute engine 517 is shown to read from and write back to state buffer memory 504, vector compute engine 517 can also process data read from a results buffer that stores output from the PE array. More generally, vector compute engine 517 may read input from state buffer memory 504 and/or the results buffer, and write the computational outputs to state buffer memory 504 and/or the results buffer. It should also be noted that although vector compute engine 517 has been described in the context of a neural network accelerator, vector compute engine 517 can be implemented in other types of data processors such as central processing units (CPUs), graphics processing units (GPUs), digital signal processors (DSPs), etc.

Figure 6:
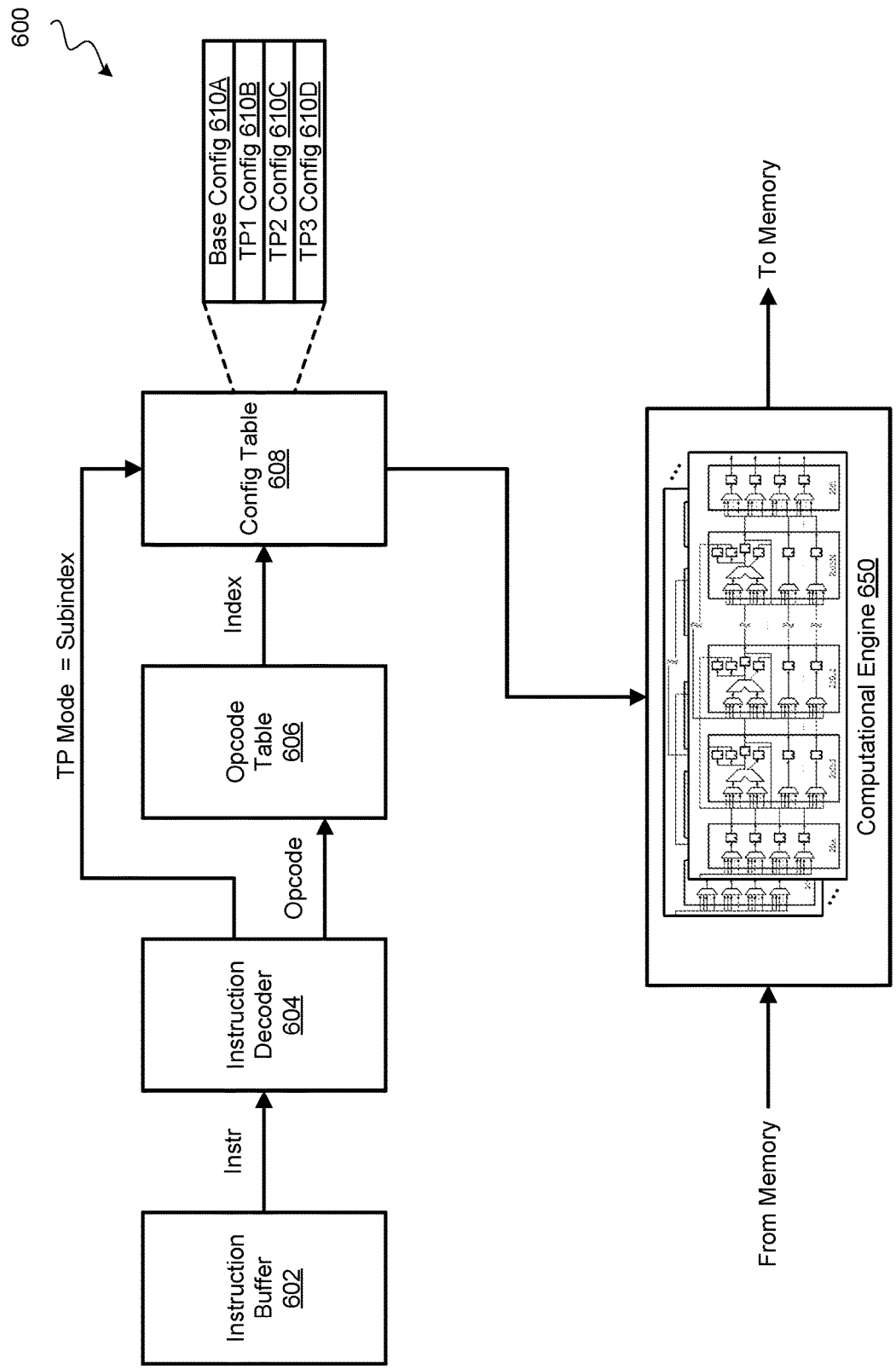
FIG. 6 illustrates a block diagram of an example of an execution engine.

FIG. 6 illustrates a block diagram of an example of an execution engine 600. Execution engine 600 can be part of a data processor (e.g., a data processing integrated circuit device such as a processor, a graphics processor, a digital signal processor, a tensor processor, a neural network accelerator, or other types of application specific integrated circuits). Execution engine 600 can include a computational engine 650, and may provide a programming interface for the computational engine 650. In some implementations, computational engine 650 can be, for example, a vector compute engine.

Computational engine 650 can include multiple compute channels to perform parallel data processing. Each of the compute channel can be implemented as a processing circuit with multiple computational circuit blocks coupled in series to form a pipeline. For example, in some implementations, a compute channel can be implemented using integrated circuit 250, and may include at least eight computational circuit blocks, and thus at least eight pipeline stages. Each of the computation circuit blocks includes a programmable ALU circuit that can be programmed to perform various functions depending on the machine instruction being executed by execution engine 600. Each compute channel can also be coupled to a memory read interface circuit (e.g., memory read interface circuit 330) and a memory write interface circuit (e.g., memory write interface circuit 370) to interface with memory accessed by computational engine 650. The memory accessed by computational engine 650 may include a state buffer memory and/or a results buffer memory. When reading input data and writing output data, computational engine 650 may read and write the state buffer memory, read and write the results buffer memory, read the state buffer memory and write to the results buffer memory, or vice versa. Hence, the term memory need not necessarily refer to a specific buffer or memory device, and may refer to one or more memory components accessible by computational engine 650 collectively.

Execution engine 600 may include an instruction buffer 602, an instruction decoder 604, an opcode table 606, and a configuration table 608 that facilitate programming of computational engine 650. Instruction buffer 602 stores a set of pending machine instructions that are executable by execution engine 600 to perform certain functions or operations. Instruction buffer 602 may include a set of entries in which each entry stores a single machine instruction. The machine instructions can be, for example, assembly-type instructions and can be part of an instruction set for the data processor architecture. Examples of instruction sets may include ARM instruction set, MIPS instruction set, x86 instruction set, or other types of proprietary instruction set tailored for a certain data processor architecture.

Instruction decoder 604 is configured to retrieve or obtain a machine instruction from instruction buffer 602, and includes instruction decoder circuitry to decode the machine instruction to determine the actions to be taken by execution engine 600. For example, instruction decoder 604 may decode a machine instruction to extract various fields including an opcode, and one or more operands (depending on the opcode) to allow execution engine 600 to perform the intended operations. In some implementations, instruction decoder 604 may decode a complex instruction into multiple opcodes and corresponding optional operands. Instruction decoder 604 may also drop or discard unrecognizable or invalid instructions. The fields extracted by instruction decoder 604 can be used to lookup configuration profiles to program or configure computational engine 650 to perform certain functions. The extracted fields from the machine instruction may also identify locations in memory to retrieve data for computational engine 650 to process, and identify locations in memory to write the results outputted from computational engine 650.

In some implementations, the opcode extracted from a machine instruction can be used to lookup an opcode entry in opcode table 606. Each opcode entry in opcode table 606 may include a pointer that can be use as an index to lookup configuration information in configuration table 608 to configure computational engine 650 to perform the function of the machine instruction. In some implementations, each opcode entry may also include other control information such as certain data rearrangement operations to apply to the input data for computational engine 650.

Configuration table 608 stores a set of configuration entries containing configuration information to program computational engine 650. For example, each configuration entry may include a microoperation and compute channel settings to configure the compute channels of computational engine 650. Each microoperation may include control settings for microoperation flow such as start/stop of execution, how many times to repeat the microoperation, trigger conditions to branch to the next microoperation, index of the next microoperation, etc. The compute channel settings may include which ALU function to program in each compute stage of the compute channel, and multiplexor select settings for the various input/output multiplexors of each compute stage, etc. The combination of the microoperation flow and compute channels allows complex computations to be implemented for the machine instruction.

In some implementations, instruction decoder 604 can determine a throughput increase mode for the machine instruction being decoded based on the input/output tensor shape and memory access pattern, datatype of the data elements begin operated on, and/or the number of compute stages or computational circuit blocks needed to implement the computation of the machine instruction. For example, instruction decoder 604 may determine that a throughput increase mode is appropriate when the number of compute stages needed to implement a computation is half or less than the total number of compute stages in the pipeline of the compute channel. The particular throughput increase mode can be selected based on the datatype of the data elements being operate on, and the number of concurrent data input streams that can be supported based on the ratio of the number of computes states in the pipeline to the number of compute stages needed to implement the computation.

The instruction decoder 604 can generate a sideband configuration signal to indicate the throughput increase mode to use. For example, the sideband configuration signal can be a 2-bit signal to indicate normal mode, a single port partial bitlength datatype mode, a multiport full bitlength datatype mode, or a multiport partial bitlength datatype mode. The throughput increase mode indication (TP Mode) can be used as a subindex to lookup the configuration information for the throughput increase mode. Depending on the throughput increase mode, the memory write interface circuit, the memory read interface circuit, and the computational circuit blocks in the compute channel will be programmed differently.

Hence, the configuration table 608 may store a set of configuration information variants for each instruction that can support throughput increase modes. The configuration information variants may include a base configuration 610A for normal mode, and throughput increase configurations 610B-D for each of the different throughput increase modes. The opcode of the machine instruction can index to the base configuration, and the throughput increase mode indication can be used as a subindex to point to the configuration entry within the set of configuration information variants 610A-D. In this manner, it is not necessary to implement separate new machine instructions for the various throughput increase modes. Instead, the same machine instruction can be used for the various throughput increase modes of the particular machine instruction, and the instruction decoder can determine the appropriate throughput increase mode to use. In some implementations, a separate decoder can be used for the throughput mode decoding, and generation of the sideband configuration signal. It should also be noted that configuration table 608 can contain configuration entries that do not have throughput mode variants. For example, instructions that utilize every compute stage of the pipeline to perform the computation may only have a normal mode of operation.

Figure 7:
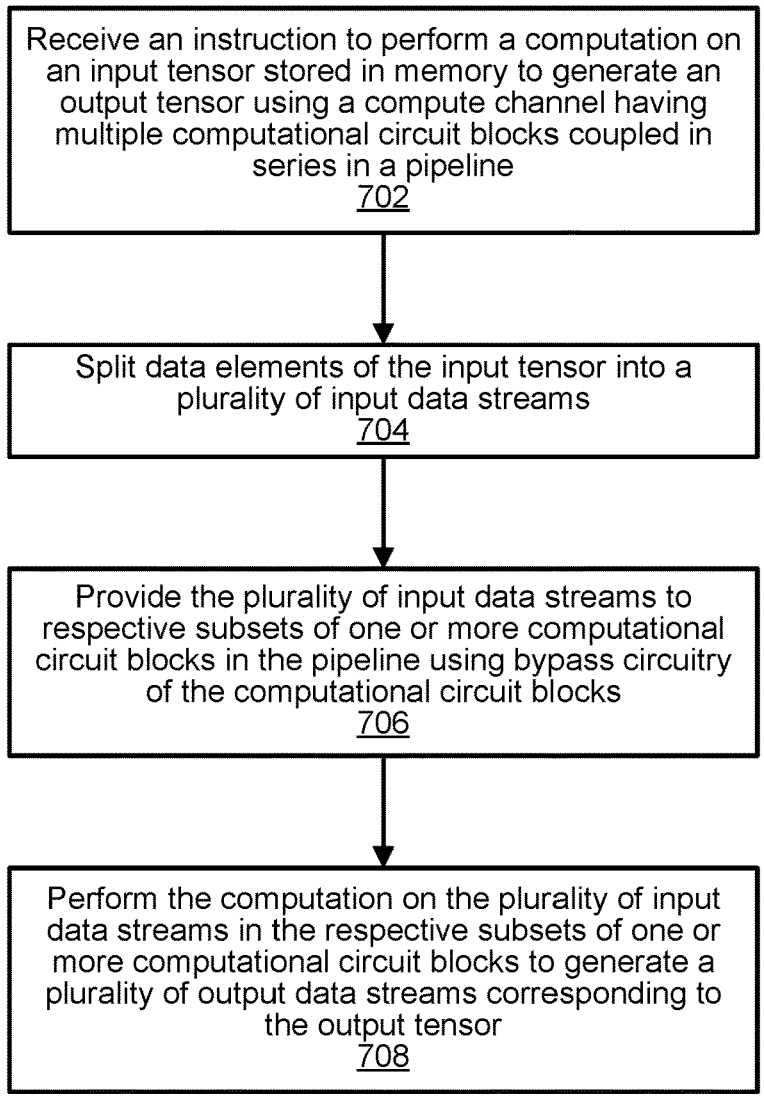
FIG. 7 illustrates a flow diagram of an example of a process for operating a compute channel.

FIG. 7 illustrates a flow diagram of an example of a process 700 for operating a compute channel of an integrated circuit device. The integrated circuit device may include a memory read interface and a memory write interface. The memory read interface may include multiple memory read ports to concurrently read data from different memory locations, and each memory read port is operable to provide an input data stream to one or more virtual input ports coupled to the memory read port. The memory write interface may include a multiple memory write ports to concurrently write data to different memory locations, and each memory write port is operable to receive an output data stream from one or more virtual output ports coupled to the memory write port. The compute channel may include multiple computational circuit blocks coupled in series in a pipeline, and is operable to perform programmable computations on input data received on the one or more virtual input ports to generate output data provided on the one or more virtual output ports. Each computational circuit block may include bypass circuitry to feed-forward data from an input of the computational circuit block to an output of the computational circuit block At block 702, process 700 may receive an instruction (e.g., machine instruction) to perform a computation on an input tensor stored in memory to generate an output tensor using the compute channel. In some implementations, a determination can be made that the computation uses half or less of the number of computational circuit blocks in the pipeline to indicate that the throughput of the compute channel can be increased. The datatype of data elements of the input tensor can also be determined from the instruction. A throughput increase mode can be selected based on the datatype and the number of computational circuit blocks used by the computation.

At block 704, data elements of the input tensor can be split into a plurality of input data streams. For example, in a multiport full bitlength datatype mode that operates on the full bitlength datatype and accesses the memory using multiple ports, the input tensor can be split into multiple input subtensors, and each of the input subtensors corresponds to one of the input data streams. The input subtensors are read concurrently from the memory on multiple memory read ports of the memory read interface to input the input data streams in parallel into the compute channel. In a single port partial bitlength datatype mode that operates on the partial bitlength datatype and accesses the memory using a single port, concatenated data elements can be read from the memory on a memory read port of the memory read interface of the compute channel. The concatenated data elements can be split into respective input data streams, and each data element can be converted into a full bitlength datatype for the computational circuit blocks.

In a multiport partial bitlength datatype mode that operates on the partial bitlength datatype and accesses the memory using the multiple ports, the input tensor can be split into multiple input subtensors. The concatenated data elements of the input subtensors are concurrently read from the memory on the memory read ports of a memory read interface to input the input subtensors in parallel into the compute channel. The concatenated data elements received on each memory read port can be split into the respective input data streams, and each data element of the input data streams can be converted into a full bitlength datatype for the computational circuit blocks.

At block 706, the input data streams are provided to respective subsets of one or more computational circuit blocks in the pipeline using bypass circuitry of the computational circuit blocks. For example, the input multiplexors of each computational circuit block can be configured to select which input data stream to process using the ALU circuit of the computation circuit block, and the other input data streams can be provided on the bypass circuitry to feed forward them to subsequent computational circuit blocks. The output data stream generated by the last computational circuit block of each subset of computational circuit block(s) can be provided be to the bypass circuitry of subsequent computational circuit blocks to provide the output data stream to a virtual output port.

At block 708, a computation is performed on the input data streams in respective subsets of one or more computational circuit blocks to generate output data streams corresponding to the output tensor. Each output data stream generated by the last computational circuit block of each subset of one or more computational circuit blocks can be provided be to the bypass circuitry of subsequent computational circuit blocks to provide the output data stream to a virtual output port. In the multiport full bitlength datatype mode, the output data streams from the virtual output ports can be concurrently written to memory on respective memory write ports of the memory write interface in parallel to write the output tensor to memory. In a single port partial bitlength datatype mode, each output data element of the output data streams provided on the virtual output ports is converted into the partial bitlength datatype, and the converted output data elements from the respective output data streams can be concatenated into concatenated output data elements to form a concatenated data stream. The concatenated data stream can then be written to memory on a memory write port of the memory write interface of the compute channel.

In a multiport partial bitlength datatype mode, each output data element of the output data streams provided on the virtual output ports is converted into a partial bitlength datatype, and the converted output data element from different output data streams are concatenated into concatenated data output data elements to form concatenated output data streams. The concatenated output data streams are then concurrently written to memory on respective memory write ports of a memory write interface in parallel to write the output tensor to memory.

Figure 8:
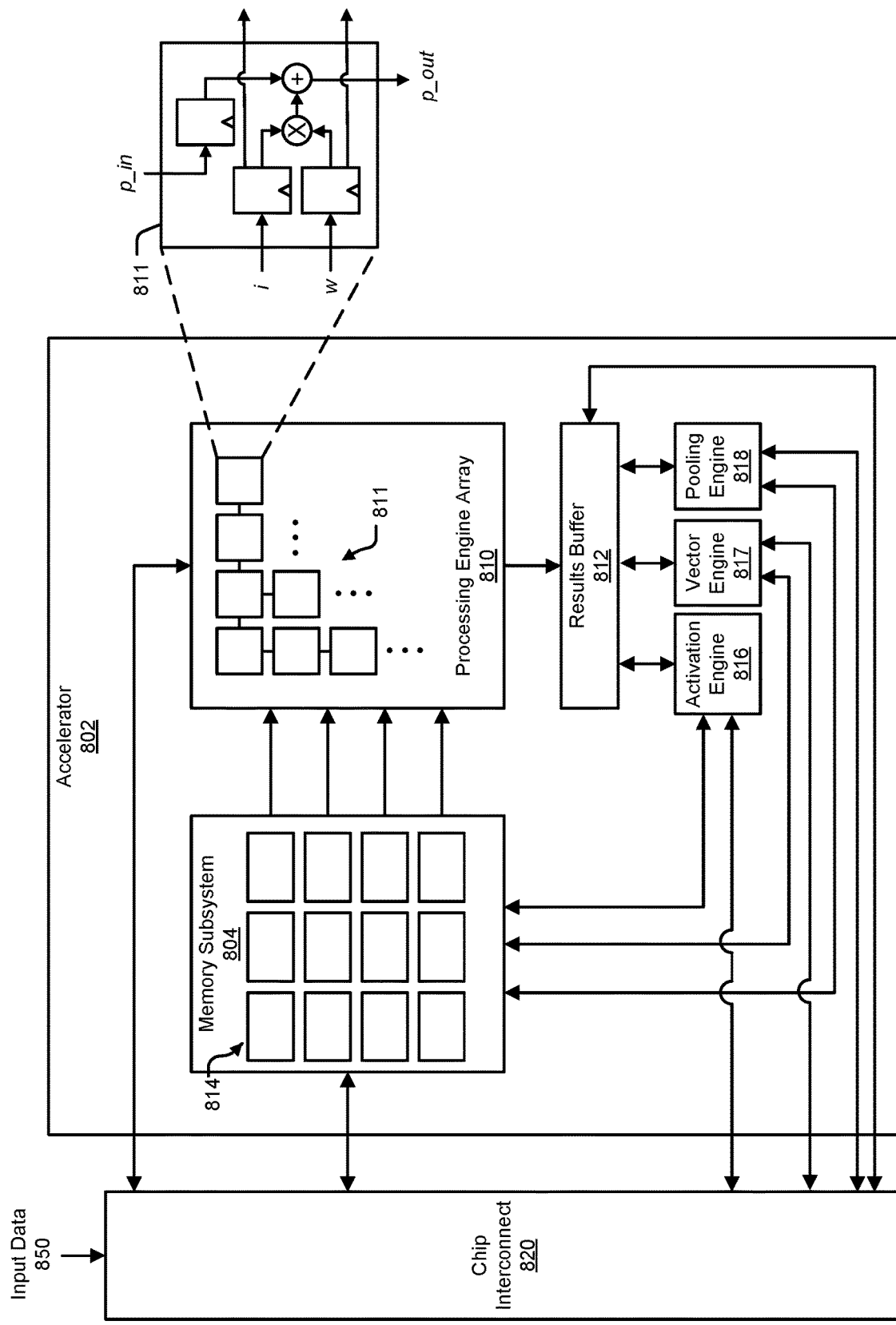
FIG. 8 illustrates a block diagram of an example of an integrated circuit device.

FIG. 8 is a block diagram illustrating an example of an integrated circuit device that can include an accelerator 802. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. Memory subsystem 804 can also be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p in, provided either from another processing engine 811 or from a previous round of computation by the processing engine array 810. When starting a computation for a new set of input data, the top row of the processing engine array 810 can receive a fixed value for p in, such as zero. As illustrated by this example, i and w are multiplied together and the result is summed with p in to produce a new partial sum, p out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817 (may also be referred to as a vector compute engine). Vector engine 817 is a compute engine that can perform computations and manipulations on values stored in memory subsystem 804 and/or results buffer 812 such as values representing matrices of input values, weight values, intermediate results, etc. In some implementations, vector engine 817 can be implemented using execution engine 600. Vector engine 817 can include multiple execution channels each with a pipeline of computation circuit blocks (e.g., arithmetic logic units) to perform complex computations such as nested multiply-and-add operations and/or complex manipulations such as sorting operations. In some implementations, each execution channel can be implemented using, for example, compute channel 250. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
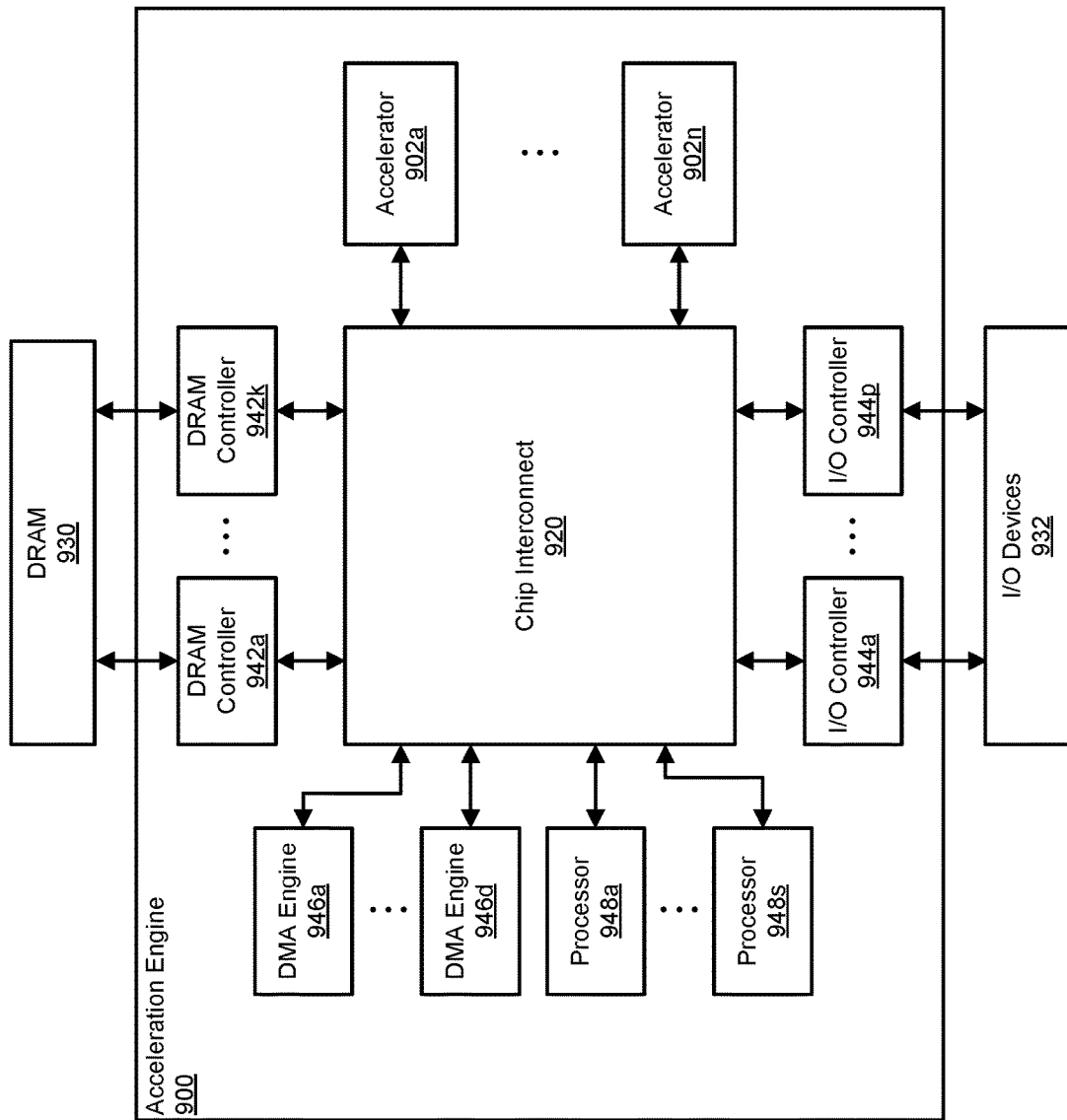
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
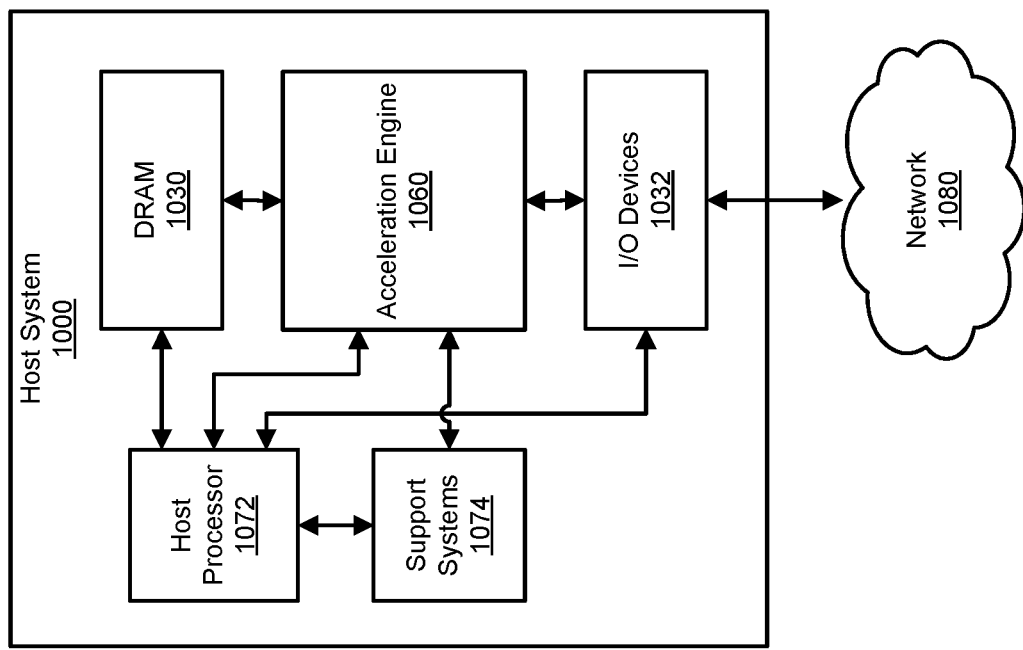
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower-level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving an instruction to perform a computation on an input tensor stored in memory to generate an output tensor using a compute channel having multiple computational circuit blocks coupled in series in a pipeline;
   determining that the computation uses half or less of the computational circuit blocks in the pipeline;
   determining a datatype of data elements of the input tensor;
   selecting a throughput increase mode from a plurality of throughput increase modes based on the datatype and a number of computational circuit blocks used by the computation, the plurality of throughput increase modes including:
   a single port partial bitlength datatype mode that operates on a partial bitlength datatype and accesses concatenated data elements from the memory using a single port;
   a multiport mode that operates on a full bitlength datatype or the partial bitlength datatype, and accesses data elements from the memory using multiple ports; and
   a multiport partial bitlength datatype mode that operates on the partial bitlength datatype and accesses concatenated data elements from the memory using the multiple ports;
   splitting the input tensor into a plurality of input data streams; and
   performing the computation on the plurality of input data streams in respective subsets of one or more computational circuit blocks to generate a plurality of output data streams corresponding to the output tensor in accordance with the selected throughput increase mode.

2. The method of claim 1, wherein the compute channel includes eight computational circuit blocks.

3. The method of claim 2, wherein the computation is a tensor scalar operation that uses two computational circuit blocks.

4. The method of claim 3, wherein the multiport partial bitlength datatype mode is capable of increasing throughput fourfold when performing the tensor scalar operation on half bitlength datatypes using dual ports to access the memory.

5. A method comprising:
   receiving an instruction to perform a computation on an input tensor stored in memory to generate an output tensor using a compute channel having multiple computational circuit blocks coupled in series in a pipeline, the compute channel operable in a plurality of throughput modes;
   decoding the instruction to determine which throughput mode of the plurality of throughput modes to use;
   splitting data elements of the input tensor into a plurality of input data streams based on the determined throughput mode;
   providing the plurality of input data streams to respective subsets of one or more computational circuit blocks in the pipeline using bypass circuitry of the computational circuit blocks; and
   performing the computation on the plurality of input data streams in the respective subsets of one or more computational circuit blocks to generate a plurality of output data streams corresponding to the output tensor.

6. The method of claim 5, wherein splitting the data elements of the input tensor into the plurality of input data streams includes:
   splitting the input tensor into a plurality of input subtensors, each of the input subtensors corresponding to one of the input data streams; and
   concurrently reading the input subtensors from the memory on a plurality of memory read ports of a memory read interface of the compute channel to input the plurality of input data streams in parallel into the compute channel.

7. The method of claim 6, further comprising:
   concurrently writing the plurality of output data streams on respective memory write ports of a memory write interface of the compute channel in parallel to write the output tensor to the memory.

8. The method of claim 6, wherein each data element of the input tensor is of a full bitlength datatype or a partial bitlength datatype.

9. The method of claim 5, wherein each data element of the input tensor is of a partial bitlength datatype, and splitting the data elements of the input tensor into the plurality of input data streams includes:
   reading concatenated data elements from the memory on a memory read port of a memory read interface of the compute channel;
   splitting the concatenated data elements into the respective input data streams; and
   converting each data element into a full bitlength datatype for the computational circuit blocks.

10. The method of claim 9, further comprising:
    converting each output data element of the output data streams into the partial bitlength datatype;
    concatenating the converted output data elements from the respective output data streams into concatenated output data elements to form a concatenated output data stream; and
    writing the concatenated output data stream to the memory on a memory write port of a memory write interface of the compute channel.

11. The method of claim 5, wherein each data element of the input tensor is of a partial bitlength datatype, and splitting the data elements of the input tensor into the plurality of input data streams includes:
    splitting the input tensor into a plurality of input subtensors;
    concurrently reading concatenated data elements of the input subtensors from the memory on a plurality of memory read ports of a memory read interface of the compute channel to input the plurality of input subtensors in parallel into the compute channel;

splitting the concatenated data elements received on each memory read port into the respective input data streams; and converting each data element of the input data streams into a full bitlength datatype for the computational circuit blocks.

12. The method of claim 11, further comprising:

converting each output data element of the output data streams into the partial bitlength datatype;

concatenating the converted output data element from different output data streams into concatenated output data elements to form concatenated output data streams; and concurrently writing the concatenated output data streams to the memory on respective memory write ports of a memory write interface of the compute channel in parallel to write the output tensor to the memory.

13. The method of claim 5, wherein the input tensor is a first input tensor having data elements of a partial bitlength datatype, and the output tensor is generated by performing a compute operation involving the first input tensor and a second input tensor having data elements of the partial bitlength datatype, and wherein the method further includes:

concurrently reading concatenated data elements from the first and second input tensors on respective memory read ports of a memory read interface of the compute channel to input the first and second input tensors in parallel into the compute channel;

splitting the concatenated data elements received at each memory read port into the respective input data streams; and converting each data element of the input data streams into a full bitlength datatype for the computational circuit blocks.

14. The method of claim 13, further comprising:

converting each output data element of the output data streams into the partial bitlength datatype;

concatenating the converted output data elements from different output data streams into concatenated data output data elements of a concatenated data stream; and writing the concatenated data elements of the concatenated data stream to the memory on a memory write port of a memory write interface of the compute channel.

15. An integrated circuit comprising:

a memory read interface circuit having a plurality of memory read ports, wherein the plurality of memory read ports are operable to concurrently read data from different memory locations, and each memory read port is operable to provide an input data stream to one or more virtual input ports coupled to the memory read port;

a memory write interface circuit having a plurality of memory write ports, wherein the plurality of memory write ports are operable to concurrently write data to different memory locations, and each memory write port is operable to receive an output data stream from one or more virtual output ports coupled to the memory write port; and a compute channel including a plurality of computational circuit blocks coupled in series in a pipeline and operable to perform programmable computations on input data received on the one or more virtual input ports to generate output data provided on the one or more virtual output ports, wherein each computational circuit block includes bypass circuitry to feed-forward data from an input of the computational circuit block to an output of the computational circuit block.

16. The integrated circuit of claim 15, further comprising a datatype conversion circuit associated with each virtual input port that is operable to convert a data element received from the corresponding memory read port in a partial bitlength datatype into a full bitlength datatype.

17. The integrated circuit of claim 15, further comprising a datatype conversion circuit associated with each virtual output port that is operable to convert a data element outputted by the virtual output port in a full bitlength datatype into a partial bitlength datatype.

18. The integrated circuit of claim 15, wherein the integrated circuit is operable in one of a plurality of throughput increase modes to perform a computation on a plurality of input data streams in respective subsets of one or more computational circuit blocks in the pipeline to generate a plurality of output data streams.

19. The integrated circuit of claim 18, wherein the throughput increase mode is selected based on a datatype of data elements in the plurality of input data streams and a number of computational circuit blocks used for the computation.

20. The integrated circuit of claim 18, further comprising a configuration table storing configuration information variants corresponding to the plurality of throughput increase modes for configuring the compute channel.

21. The integrated circuit of claim 20, further comprising an instruction decoder operable to decode a machine instruction, select the throughput increase mode, and generate a subindex to lookup the corresponding configuration information variant for the selected throughput increase mode.

* * * * *